United States Patent
Noguchi et al.

(10) Patent No.: US 11,719,817 B2
(45) Date of Patent: Aug. 8, 2023

(54) DISTANCE-MEASURING APPARATUS AND CONTROL METHOD

(71) Applicant: NEC CORPORATION, Tokyo (JP)

(72) Inventors: Hidemi Noguchi, Tokyo (JP); Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 16/772,346

(22) PCT Filed: Dec. 15, 2017

(86) PCT No.: PCT/JP2017/045148
§ 371 (c)(1),
(2) Date: Jun. 12, 2020

(87) PCT Pub. No.: WO2019/116549
PCT Pub. Date: Jun. 20, 2019

(65) Prior Publication Data
US 2021/0072383 A1    Mar. 11, 2021

(51) Int. Cl.
*G01S 17/32* (2020.01)
*G01S 17/18* (2020.01)
*G01C 3/08* (2006.01)

(52) U.S. Cl.
CPC .............. *G01S 17/32* (2013.01); *G01S 17/18* (2020.01); *G01C 3/08* (2013.01)

(58) Field of Classification Search
None
See application file for complete search history.

(56) References Cited

U.S. PATENT DOCUMENTS

| | | | |
|---|---|---|---|
| 7,679,729 B2* | 3/2010 | Ando | G01S 7/497 |
| | | | 356/28 |
| 7,940,378 B2* | 5/2011 | Gogol | G01S 17/10 |
| | | | 356/5.15 |
| 9,482,755 B2* | 11/2016 | Cramer | G01S 7/48 |

(Continued)

FOREIGN PATENT DOCUMENTS

| | | |
|---|---|---|
| EP | 3474039 A1 | 4/2019 |
| JP | 2004-77479 A | 3/2004 |

(Continued)

OTHER PUBLICATIONS

International Search Report for PCT/JP2017/045148 dated Mar. 6, 2018.

(Continued)

*Primary Examiner* — Irfan Habib
(74) *Attorney, Agent, or Firm* — Sughrue Mion, PLLC

(57) ABSTRACT

A distance-measuring apparatus (2000) generates transmission light by generating a distance measurement signal, and subjecting an optical carrier wave to quadrature modulation on the basis of the generated distance measurement signal. The distance-measuring apparatus (2001) outputs transmission light, and receives reflected light generated by reflecting the transmission light on an object (10) to be measured. The distance-measuring apparatus (2000) compares the received reflected light with reference light to compute a distance from the distance-measuring apparatus (2000) to the object (10) to be measured.

14 Claims, 20 Drawing Sheets

(56) References Cited

U.S. PATENT DOCUMENTS

| | | | |
|---|---|---|---|
| 2004/0105087 A1* | 6/2004 | Gogolla | G01S 17/36 |
| | | | 356/3 |
| 2006/0062324 A1 | 3/2006 | Naito et al. | |
| 2008/0018881 A1 | 1/2008 | Hui et al. | |
| 2015/0043925 A1* | 2/2015 | Fujisawa | H04B 10/60 |
| | | | 398/208 |
| 2019/0120961 A1 | 4/2019 | Marra et al. | |
| 2020/0072974 A1* | 3/2020 | Okada | H04B 11/00 |

FOREIGN PATENT DOCUMENTS

| | | |
|---|---|---|
| JP | 2007-93620 A | 4/2007 |
| JP | 2011-7805 A | 1/2011 |
| JP | 2014-102258 A | 6/2014 |
| WO | 2017/122637 A1 | 7/2017 |

OTHER PUBLICATIONS

Extended European Search Report for EP Application No. EP17934989.9 dated Nov. 26, 2020.

EP Office Action for EP Application No. 17934989.9, dated May 10, 2023.

Peter Adany et al.: "Chirped Lidar Using Simplified Homodyne Detection", Journal of Lightwave Technology, IEEE, USA, vol. PP, No. 16, Aug. 15, 2009 (Aug. 15, 2009), pp. 3351-3357, XP011256342.

* cited by examiner

DISTANCE-MEASURING APPARATUS AND CONTROL METHOD

TECHNICAL FIELD

Cross-Reference To Related Applications

This application is a National Stage of International Application No. PCT/JP2017/045148 filed on Dec. 15, 2017, the disclosure of which is incorporated herein in its entirety by reference.

The present invention relates to a distance-measuring apparatus.

BACKGROUND ART

A distance-measuring apparatus that measures distance using a light wave has been developed. The distance-measuring apparatus using a light wave measures a distance by transmitting predetermined transmission light from the distance-measuring apparatus, receiving reflected light generated by reflecting the transmission light on an object to be measured, and analyzing the reflected light. Examples of distance measurement methods include: a time-of-flight measurement method (time-of-flight (ToF) method) in which a distance is computed based on time (time from transmission of transmission light to reception of reflected light) of flight of reflected light; a frequency difference detection method (for example, frequency modulated continuous wave (FMCW) method) in which a distance is computed based on a frequency difference between the transmission light and the reflected light; or a phase difference detection method.

Example of prior art document disclosing an apparatus that measures distance using a light wave includes Patent Document 1. Patent Document 1 discloses a method in which intensity of light is modulated, based on a chirp signal, to generate transmission light, and a distance is measured, based on a frequency difference between reflected light and the transmission light.

RELATED DOCUMENT

Patent Document

[Patent Document 1] U.S. Patent Application Publication No. 2008/0018881

DESCRIPTION

Summary Of The Invention

Technical Problem

The present inventors found a new technique for measuring distance using a light wave. One of the objects of the present invention is to provide the new technique for measuring distance using a light wave.

Solution to Problem

A distance-measuring apparatus of the present invention includes: 1) a generation unit that generates a distance measurement signal; 2) a quadrature modulation unit that subjects an optical carrier wave to quadrature modulation, based on the distance measurement signal, to generate transmission light; 3) a transmission unit that transmits the generated transmission light; 4) a reception unit that receives reflected light which is light generated by reflecting the transmission light on an object to be measured; and 5) a computation unit that compares the reflected light with reference light to compute a distance to the object to be measured.

A control method of the present invention is a control method executed by a computer. The control method includes: 1) a generation step of generating a distance measurement signal; 2) a quadrature modulation step of subjecting an optical carrier wave to quadrature modulation, based on the distance measurement signal, to generate transmission light; 3) a transmission step of transmitting the generated transmission light; 4) a reception step of receiving reflected light which is light generated by reflecting the transmission light on an object to be measured; and 5) a computation step of comparing the reflected light with reference light to compute a distance to the object to be measured.

Advantageous Effects of Invention

According to the present invention, there is provided a new technique for measuring distance using a light wave.

BRIEF DESCRIPTION OF THE DRAWINGS

The objects described above, other objects, features, and advantages will be further clear from the description of preferred example embodiments described below with reference to the following attached drawings.

DESCRIPTION OF EMBODIMENTS

Figure 1:
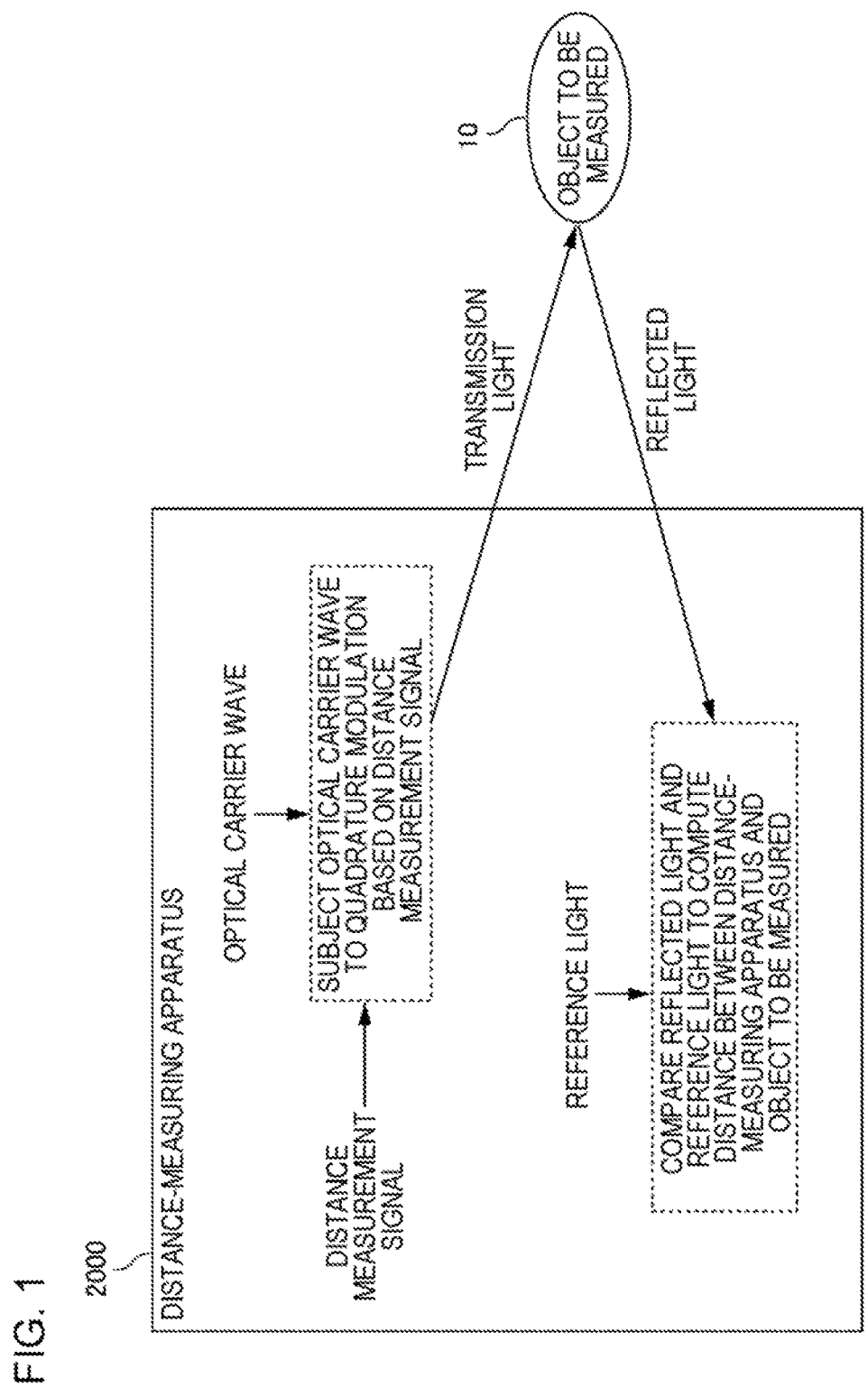
FIG. 1 is a diagram for conceptually explaining the operation of a distance-measuring apparatus according to an example embodiment 1.

Example embodiments of the present invention will be described below with reference to the drawings. In all the drawings, similar components are denoted by similar reference characters, and the descriptions thereof will not be repeated as appropriate. Moreover, in each block diagram, each block represents the configuration of a functional unit rather than the configuration of a hardware unit, unless otherwise stated.

Example Embodiment 1

Overview

FIG. 1 is a diagram for conceptually explaining the operation of a distance-measuring apparatus 2000 according to an example embodiment 1. Note that FIG. 1 is a diagram for an illustration for the purpose of facilitating understanding of the operation of the distance-measuring apparatus 2000, and the operation of the distance-measuring apparatus 2000 is not limited at all by FIG. 1.

The distance-measuring apparatus 2000 is an apparatus that uses a light wave to perform measurement (distance measurement) of a distance from the distance-measuring apparatus 2000 to an object 10 to be measured. Commonly, in distance measurement using a light wave, a distance is computed by transmitting transmission light generated by modulating a light wave as a carrier wave (hereinafter, optical carrier wave) with a distance measurement signal, receiving reflected light generated by reflecting the transmission light on an object to be subjected to the distance measurement, and analyzing the reflected light. Examples of distance measurement methods using light waves include various methods such as a time-of-flight measurement method (ToF method), a frequency difference detection method (for example, FMCW method), and a phase difference detection method.

The distance-measuring apparatus 2000 generates transmission light by generating a distance measurement signal, and subjecting an optical carrier wave to quadrature modulation on the basis of the generated distance measurement signal. In other words, the distance-measuring apparatus 2000 generates transmission light of interest by modulating each of the in-phase component (In-Phase (I) component) and quadrature component (Quadrature-Phase (Q) component) of the optical carrier wave on the basis of the distance measurement signal.

The distance-measuring apparatus 2000 receives reflected light generated by reflecting, on the object 10 to be measured, transmission light generated as described above. The distance-measuring apparatus 2000 compares the received reflected light with reference light to compute a distance from the distance-measuring apparatus 2000 to the object 10 to be measured. For example, in the case of using a frequency difference detection method, the distance-measuring apparatus 2000 computes a measurement distance on the basis of a frequency difference between the reference light and reflected light. Note that reference light is a light signal corresponding to transmission light or an optical carrier wave.

Advantageous Effects

In accordance with the distance-measuring apparatus 2000 of the present example embodiment, there is provided a new technology to measure a distance using transmission light generated by subjecting an optical carrier wave to quadrature modulation on the basis of a distance measurement signal. The use of the quadrature modulation has, for example, such advantages as described below.

First, when an optical carrier wave is modulated based on a chirp signal, frequency variations represented by the chirp signal can be superimposed on transmission light by modulating the frequency per se of the optical carrier wave. In this regard, in the technology of Patent Document 1, frequency variations represented by a chirp signal are represented as variations in the intensity of an optical carrier wave. A method in which information about frequency variations is represented by the frequency variations of transmission light has an advantage in high resistance to amplitude noises, resulting in high reception sensitivity, in comparison with a method in which information about frequency variations is represented by the intensity variations of transmission light.

Then, the use of quadrature modulation enables two elements of the intensity and frequency of the optical carrier wave to be simultaneously modulated by a quadrature modulator. Therefore, the use has advantages in that the size of the hardware of the distance-measuring apparatus 2000 can be decreased (the distance-measuring apparatus 2000 can be downsized) and in that the production cost of the distance-measuring apparatus 2000 can be decreased.

The details of the present example embodiment will be further described below.

Example of Functional Configuration of Distance-Measuring Apparatus 2000

Figure 2:
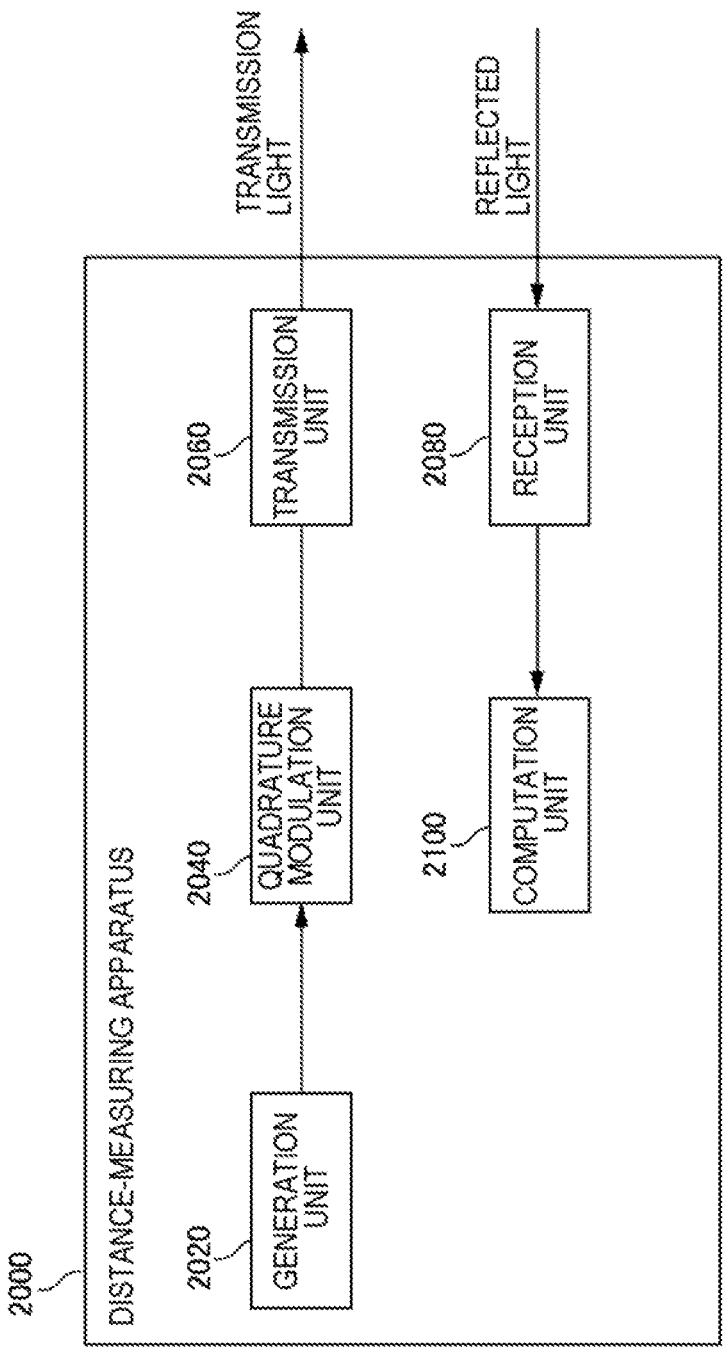
FIG. 2 is a diagram illustrating the functional configuration units of the distance-measuring apparatus.

FIG. 2 is a diagram illustrating the functional configuration units of the distance-measuring apparatus 2000. The distance-measuring apparatus 2000 includes a generation unit 2020, a quadrature modulation unit 2040, a transmission unit 2060, a reception unit 2080, and a computation unit 2100. The generation unit 2020 generates a distance measurement signal. The quadrature modulation unit 2040 subjects an optical carrier wave to quadrature modulation on the basis of the distance measurement signal, to generate transmission light. The transmission unit 2060 transmits the generated transmission light. The reception unit 2080 receives reflected light which is light generated by reflecting transmission light on the object 10 to be measured. The computation unit 2100 compares the received reflected light with reference light to compute a distance to the object to be measured. The reference light is an optical carrier wave, transmission light, or local light generated by a separately placed light source.

Example of Hardware Configuration

Figure 3:
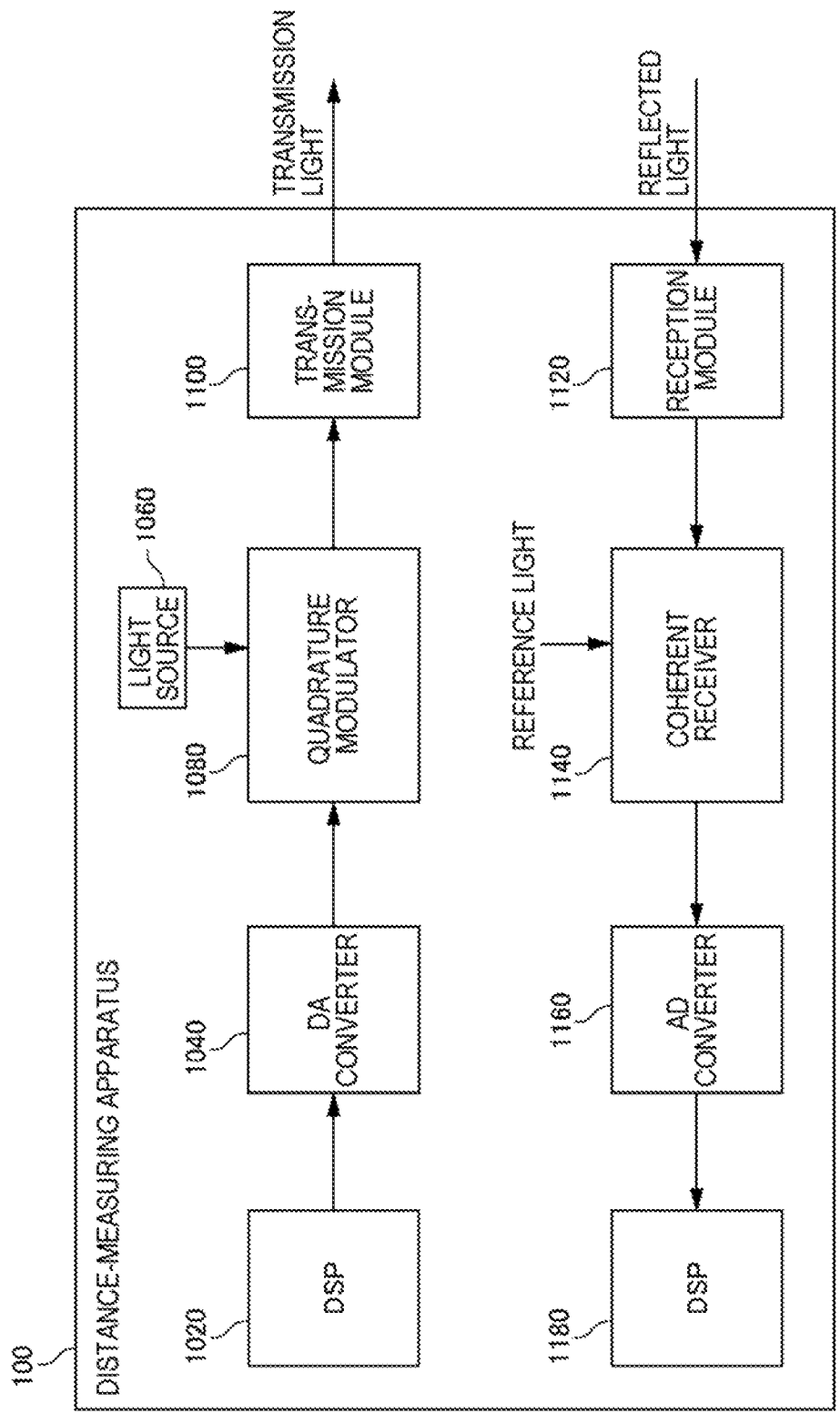
FIG. 3 is a diagram illustrating the hardware configuration of the distance-measuring apparatus.

FIG. 3 is a diagram illustrating the hardware configuration of the distance-measuring apparatus 2000. The distance-measuring apparatus 2000 in FIG. 3 includes a digital signal processor (DSP) 1020, a digital-analog (DA) converter 1040, a light source 1060, a quadrature modulator 1080, a transmission module 1100, a reception module 1120, a coherent receiver 1140, an analog-digital (AD) converter 1160, and a digital signal processor 1180.

The digital signal processor 1020 is a processor that realizes the generation unit 2020. The digital signal processor 1020 outputs a digital signal representing a distance measurement signal. The distance measurement signal output from the digital signal processor 1020 is converted into an analog electric signal by the digital-analog converter 1040.

The quadrature modulator 1080 is a quadrature modulator that realizes the quadrature modulation unit 2040. For example, the quadrature modulator 1080 is realized by a Mach-Zehnder type optical modulator. The light source 1060 is any optional light source that outputs an optical carrier wave. For example, when laser light is used as transmission light, the light source 1060 is realized by a laser oscillator or the like. The quadrature modulator 1080 performs quadrature modulation of an optical carrier wave output from the light source 1060 on the basis of a distance measurement signal. More specifically, the quadrature modulator 1080 performs quadrature modulation of an optical carrier wave output from the light source 1060, using an analog signal output from the digital-analog converter 1040.

The transmission module 1100 is a module that realizes the transmission unit 2060. The transmission module 1100 includes an optical system (such as a lens) for outputting transmission light to the outside of the distance-measuring apparatus 2000, and an optical system (such as a mirror) for controlling the output direction of transmission light.

The reception module 1120 is a module that realizes the reception unit 2080. The reception module 1120 includes an optical system (such as a lens or a mirror) for taking reflected light into the interior of the distance-measuring apparatus 2000.

The coherent receiver 1140, the analog-digital converter 1160, and the digital signal processor 1180 are hardware components that realize the computation unit 2100. For example, the coherent receiver 1140 includes a light coherent mixer that mixes reflected light and reference light to generate an optical beat signal, and a balanced receiver that photoelectrically converts the optical beat signal, and thus outputs an analog electric signal corresponding to the optical beat signal of the reflected light and the reference light. Hereinafter, an analog electric signal output from the coherent receiver 1140 (i.e., an electric signal obtained by photoelectrically converting an optical beat signal) is referred to as "analog beat signal".

The configuration of the coherent receiver 1140 is not limited to the configuration described above. For example, the coherent receiver 1140 may have a configuration in which quadrature reception is performed by a quadrature receiver. In this case, more specifically, the coherent receiver 1140 includes an IQ mixer (90-degree hybrid) and two balanced receivers.

Figure 4:
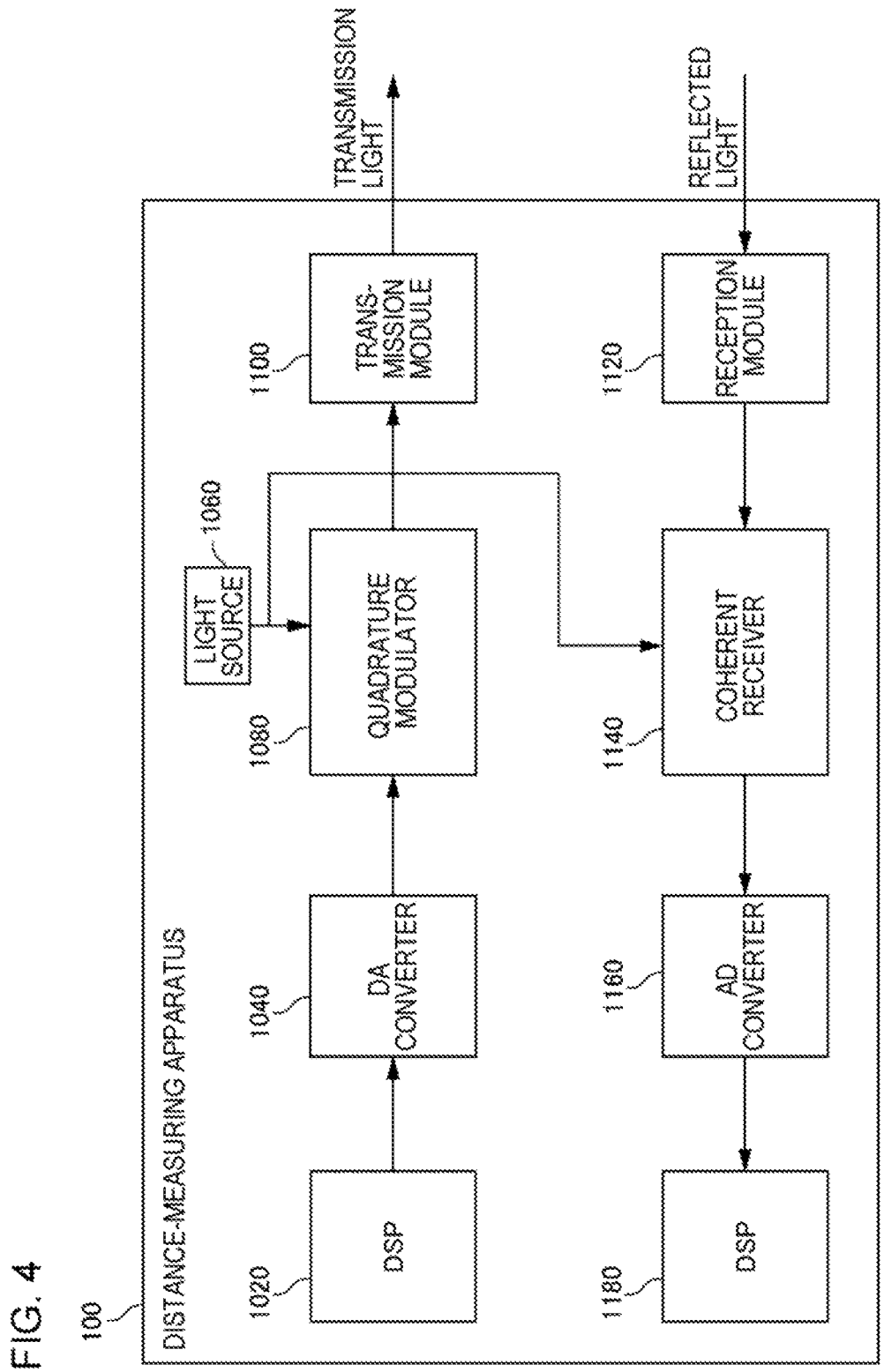
FIG. 4 is a diagram illustrating variations in reference light.
Figure 5:
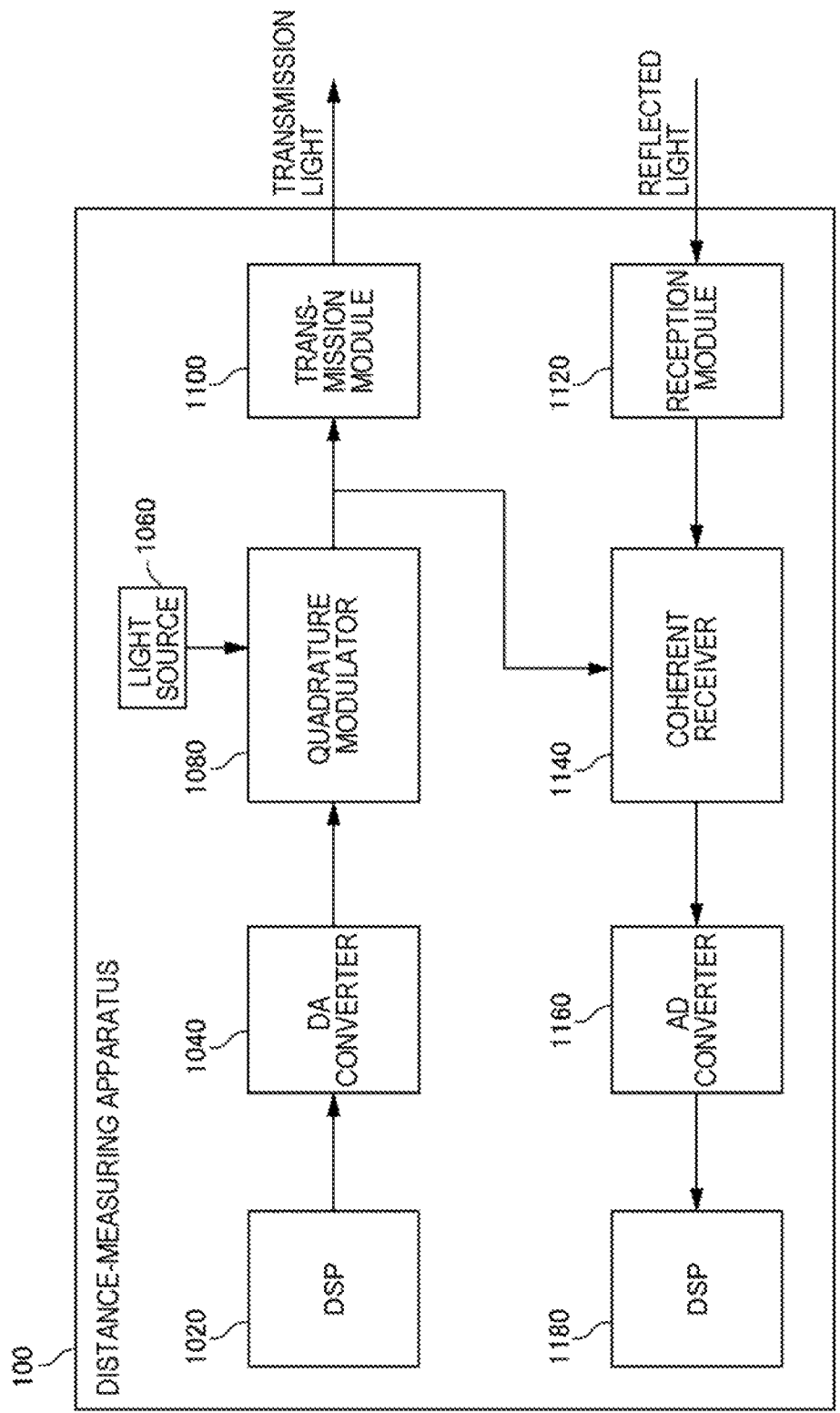
FIG. 5 is a diagram illustrating variations in reference light.
Figure 6:
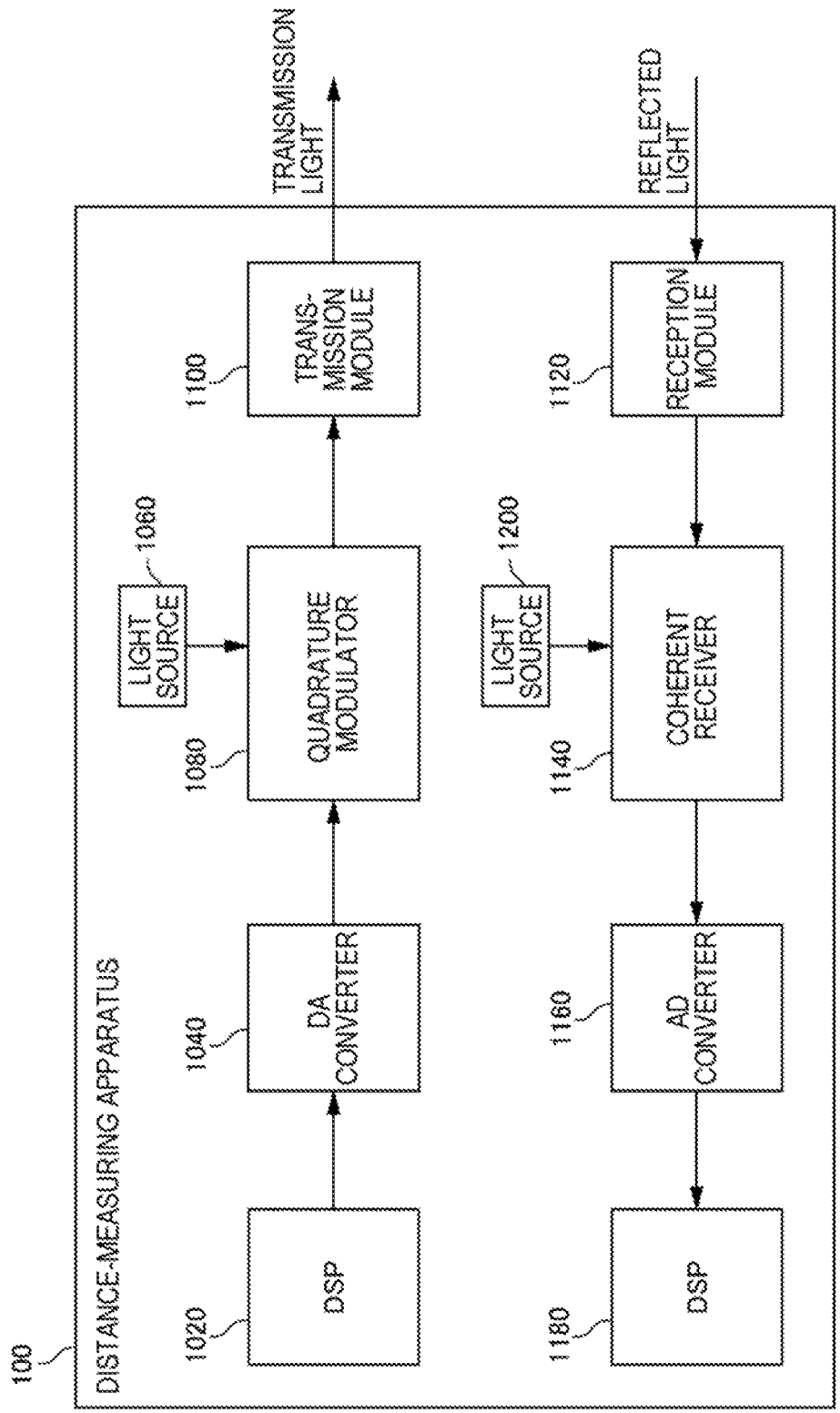
FIG. 6 is a diagram illustrating variations in reference light.

As reference light input into the coherent receiver 1140, 1) an optical carrier wave output from the light source 1060, 2) transmission light output from the quadrature modulator 1080, 3) local light output from another separately disposed light source, or the like can be used. FIGS. 4, 5, and 6 are diagrams illustrating the variations of reference light. FIGS. 4, 5, and 6 illustrate the cases 1), 2), and 3) described above, respectively. Note that a configuration is also acceptable in which a switch mechanism that allows such three types of reference light to be selectively input into the reception unit 2080 is disposed, and any of the three types of reference light can be used as appropriate by selecting a switch (not illustrated).

The analog beat signal output from the coherent receiver 1140 is input into the analog-digital converter 1160. The analog beat signal is converted into a digital signal by the analog-digital converter 1160. Hereinafter, the digital signal obtained by converting the analog beat signal into the digital signal is referred to as "digital beat signal". The reception unit 2080 outputs the digital beat signal. Note that when the coherent receiver 1140 is configured as a quadrature receiver, two analog-digital converters 1160 are disposed, and the analog beat signal of each of the in-phase and quadrature components of reflected light is converted into a digital beat signal.

The digital beat signal output from the analog-digital converter 1160 is input into the digital signal processor 1180. The digital signal processor 1180 analyzes the digital beat signal output from the analog-digital converter 1160 to compute a distance to the object 10 to be measured. Note that when the coherent receiver 1140 is configured as a quadrature receiver, the digital signal processor 1180 analyzes a complex signal represented by a set of the digital beat signal of the in-phase component of reflected light and the digital beat signal of the quadrature component of the reflected light to compute the distance to the object 10 to be measured.

Note that the digital signal processor 1180 acquires information about a distance measurement signal (information about distance measurement method and settings thereof) in order to analyze the digital beat signal. For example, the information is stored in a storage apparatus that can be accessed from both the digital signal processor 1020 and the digital signal processor 1180. In such a manner, the digital signal processor 1020 can generate a distance measurement signal according to the information read from the storage apparatus, and the digital signal processor 1180 can recognize, e.g., settings on the distance measurement signal by reading the information from the storage apparatus.

The computation unit 2100 may further include a compensation circuit (not illustrated) for compensating the aberration of an optical system, imperfection in analog electric circuit characteristics included in transmission and reception, and the like with respect to a digital signal output from the analog-digital converter. For example, an existing technology can be used for realizing the compensation circuit.

Flow of Process

Figure 7:
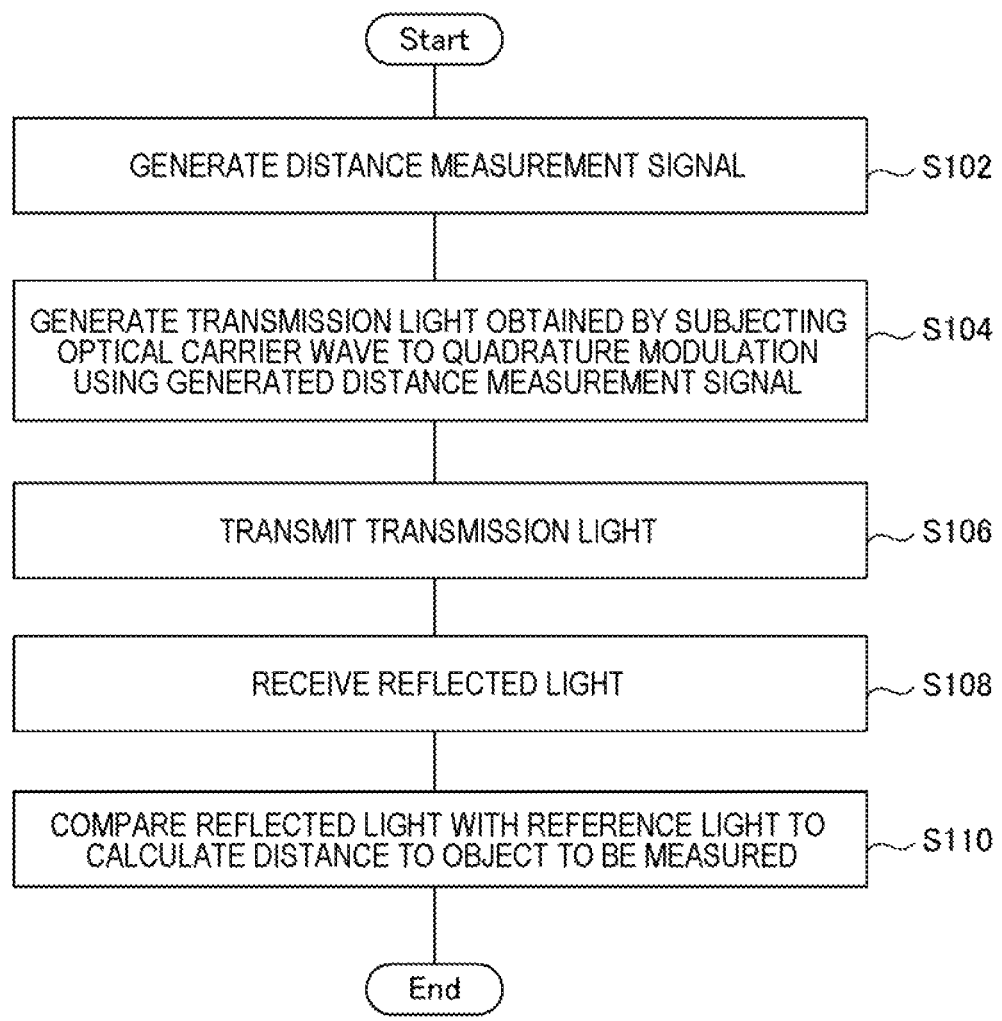
FIG. 7 is a flow chart illustrating the flow of processes executed by the distance-measuring apparatus.

FIG. 7 is a flow chart illustrating the flow of processes executed by the distance-measuring apparatus 2000. The generation unit 2020 generates a distance measurement signal (S102). The quadrature modulation unit 2040 generates transmission light obtained by subjecting an optical carrier wave to quadrature modulation using the generated distance measurement signal (S104). The transmission unit 2060 transmits the generated transmission light (S106). The reception unit 2080 receives reflected light generated by reflecting the transmission light on the object 10 to be measured (S108). The computation unit 2100 compares the reflected light with reference light to compute a distance to the object 10 to be measured (S110).

Detailed Description of Each of Distance Measurement Methods

The distance-measuring apparatus 2000 can use various distance measurement methods. The operation of the distance-measuring apparatus 2000 will be described in more detail below according to each distance measurement method used by the distance-measuring apparatus 2000.

Frequency Difference Detection Method

In a frequency difference detection method, a distance to a target for measurement is computed using a frequency difference between the reflected light and reference light. When the frequency difference detection method is used, for example, the quadrature modulation unit 2040 modulates an optical carrier wave so that the frequency of the optical carrier wave varies on the time axis. For example, transmission light is realized as a repetition of a chirp signal. For this reason, a distance measurement signal represents a time change of the frequency of the optical carrier wave.

Figure 8:
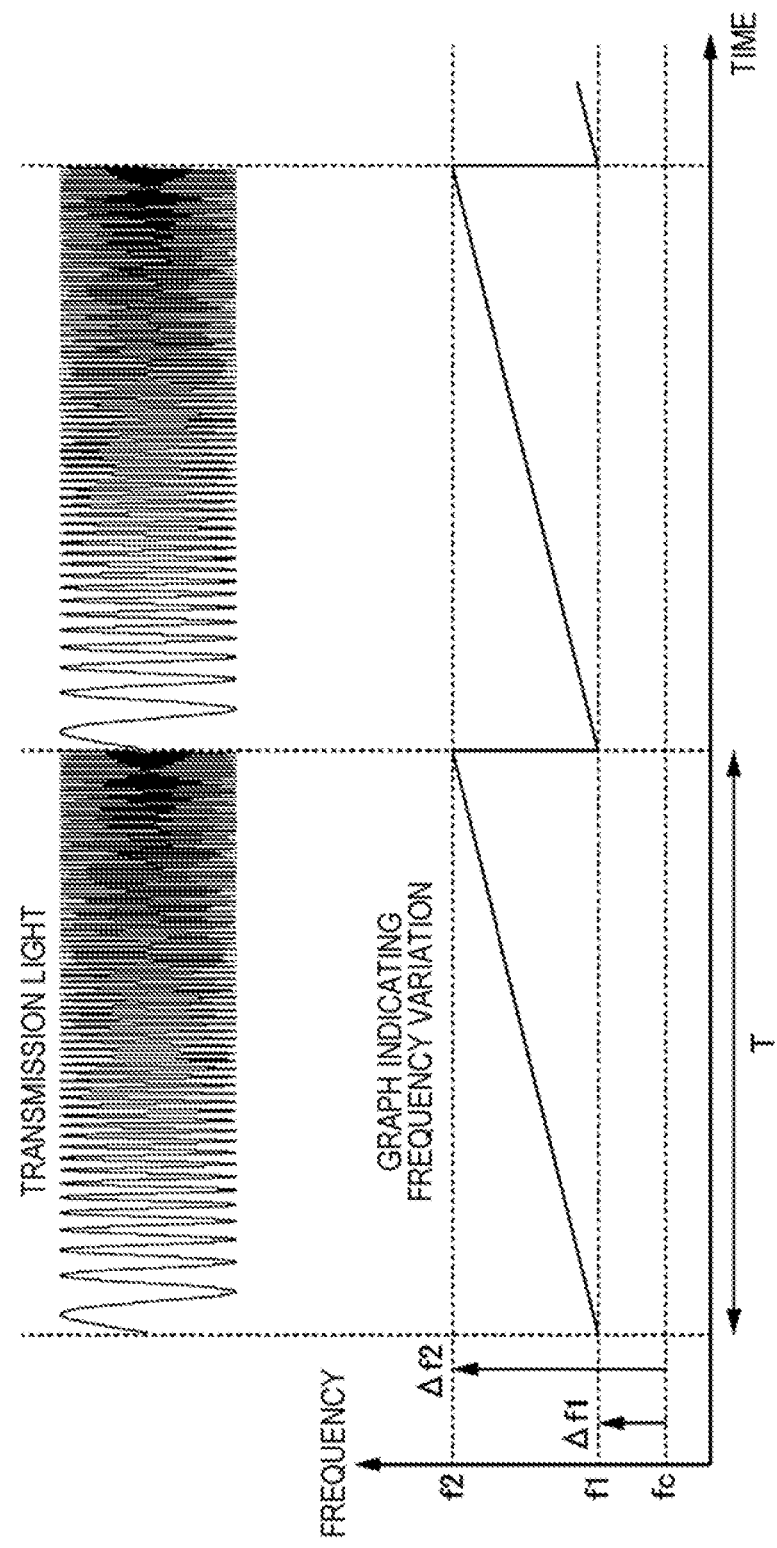
FIG. 8 is a diagram schematically illustrating transmission light in a frequency difference detection method.

FIG. 8 is a diagram schematically illustrating transmission light in the frequency difference detection method. The upper section of FIG. 8 schematically represents transmission light. Originally, the frequency of light is very high, and it is difficult to precisely illustrate light as a wave. Therefore, here, light is expressed as a sine wave with a slow cycle for descriptive purposes so that the frequency of light can be imaged. In addition, a scene in which the frequency gradually varies is schematically illustrated with constant light intensity. The lower section of FIG. 8 illustrates variations in the frequency of the optical carrier wave subjected to the frequency modulation. Here, it is illustrated that the frequency of a light signal output from the quadrature modulation unit 2040 increases linearly from f1 to f2 at a cycle T. Note that fc represents the frequency of an optical carrier wave output from the transmission-side light source 1060. In addition, Δf1 and Δf2 are values defined as Δf1=f1−fc and Δf2=f2−fc, respectively. In other words, a light signal output from the quadrature modulation unit 2040 becomes a light signal obtained by subjecting a light signal with an optical frequency fc output from a light source to frequency modulation from Δf1 to Δf2. As a result, a light signal of which the optical frequency varies from fc+Δf1 to fc+Δf2 is obtained.

In a case in which a chirp signal of which the optical frequency per se varies linearly as illustrated in FIG. 8 is generated, chirp transmission light of which the light intensity is constant and the frequency varies linearly can be generated by setting each of the modulating signals of an in-phase component and a quadrature component which drive the quadrature modulation unit 2040 to a signal represented by the following mathematical equations (1). I(t) and Q(t) represent the modulating signals of the in-phase component and the quadrature component at time t, respectively. Hereinafter, these modulating signals are also referred to as distance measurement signals. In other words, each of the distance measurement signal of the in-phase component (distance measurement signal for modulating in-phase component of optical carrier wave) and the distance measurement signal of the quadrature component (distance measurement signal for modulating quadrature component of optical carrier wave) is input into the quadrature modulation unit 2040, and the quadrature modulation unit 2040 is driven by the two distance measurement signals. Note that these signals can be easily generated by the transmission-side digital signal processor 1020, and are converted into an analog electric signal by the digital-analog converter 1040, and then input into the quadrature modulation unit 2040. A desired optical chirp signal can be generated by driving the quadrature modulation unit 2040 in such a manner.

[Math. 1]

$$I(t) = \cos\left(2\pi\Delta f_1 t + \pi\frac{\Delta f_2 - \Delta f_1}{T}t^2\right) \quad (1)$$

$$Q(t) = \sin\left(2\pi\Delta f_1 t + \pi\frac{\Delta f_2 - \Delta f_1}{T}t^2\right)$$

The transmission unit 2060 transmits transmission light generated as described above. The reception unit 2080 receives reflected light generated by reflecting the transmission light on the object 10 to be measured, and allows the reflected light and reference light to interfere with each other and to be heterodyne-received, to thereby output the digital beat signal described above. The transmission light is used as the reference light.

Figure 9:
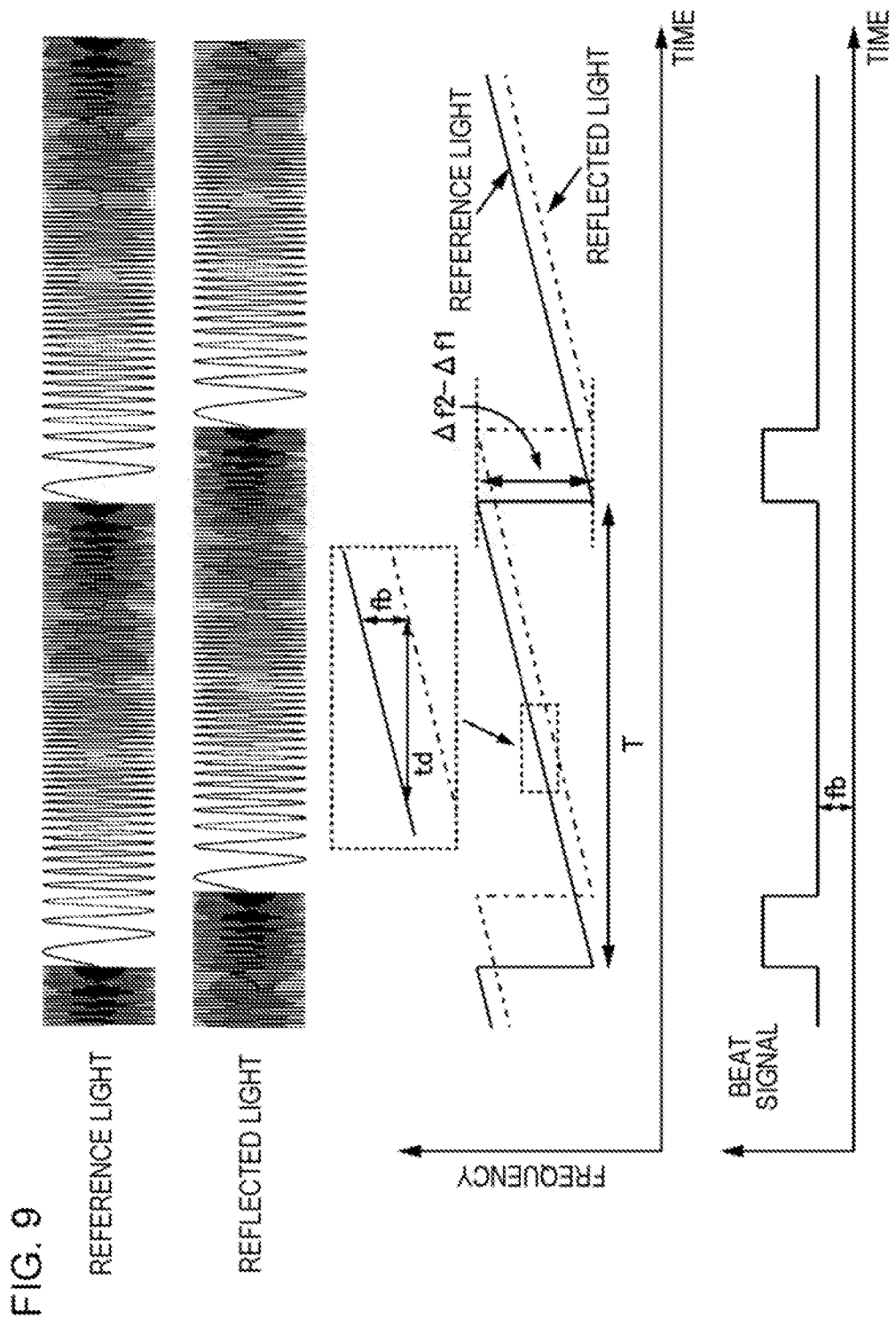
FIG. 9 is a diagram schematically illustrating a relationship between the frequencies of reference light and reflected light, and a digital beat signal.

FIG. 9 is a diagram schematically illustrating a relationship between the frequencies of reference light and reflected light, and a digital beat signal. Reflected light lags behind reference light according to a distance from the distance-measuring apparatus 2000 to the object to be measured. For example, in an example of FIG. 9, the reflected light lags behind the reference light by td. As a result, a digital beat signal illustrated in FIG. 9 is obtained.

The computation unit 2100 analyzes the digital beat signal to compute the distance from the distance-measuring apparatus 2000 to the object 10 to be measured. For example, the computation unit 2100 determines a frequency difference fb between the reflected light and reference light, and computes the distance from the distance-measuring apparatus 2000 to the object 10 to be measured using the following mathematical equation (2):

[Math. 2]

$$R = \frac{ct_d}{2} = \frac{cT}{2(\Delta f_2 - \Delta f_1)}f_b \quad (2)$$

R represents the distance from the distance-measuring apparatus 2000 to the object 10 to be measured. c represents the velocity of light. Note that a distance measurement signal is generated based on the mathematical equation (1). Therefore, T represents the cycle of the distance measurement signal, Δf2 represents the maximum value of frequency modulation, and Δf1 represents the minimum value of frequency modulation.

Phase Difference Detection Method

In a phase difference detection method, a distance to a target for measurement is computed using a phase difference between reflected light and reference light. When the phase difference detection method is used, for example, the quadrature modulation unit 2040 modulates an optical carrier wave so that the intensity of the optical carrier wave varies on the time axis.

Figure 10:
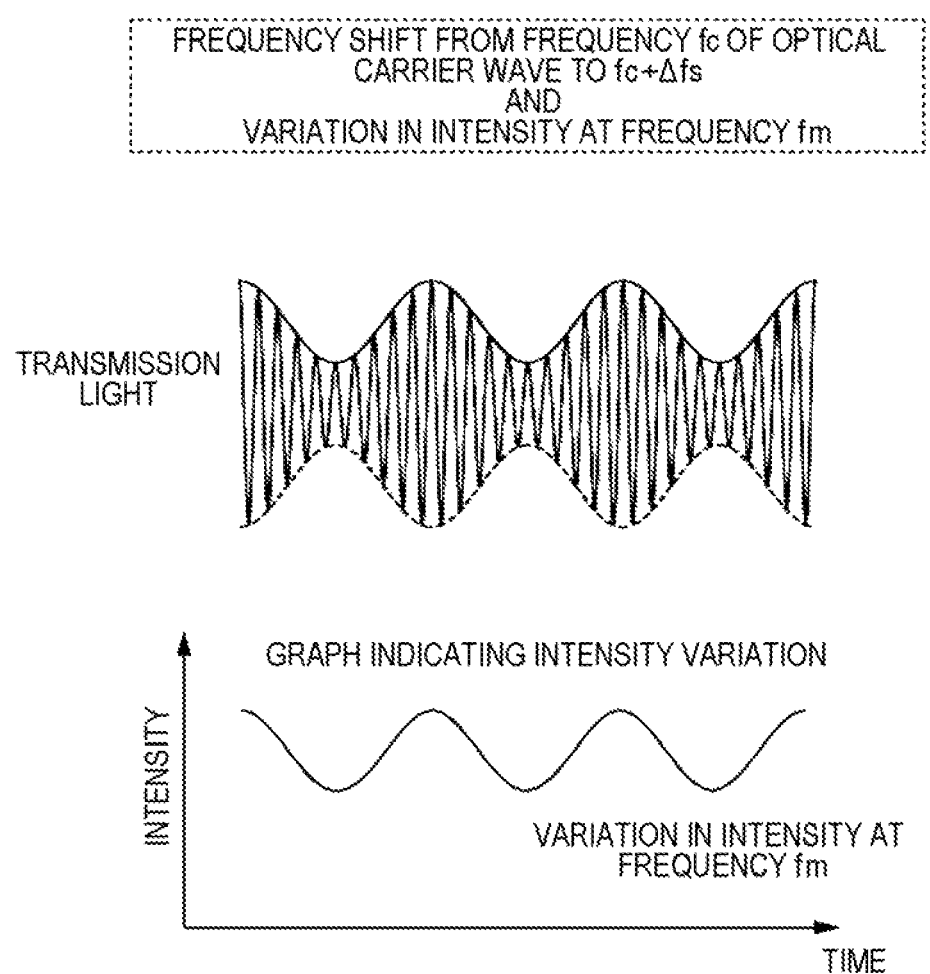
FIG. 10 is a diagram schematically illustrating transmission light in a phase difference detection method.

FIG. 10 is a diagram schematically illustrating transmission light in the phase difference detection method. Like FIG. 8, an optical carrier wave is illustrated as a sine wave with a slow cycle for descriptive purposes so that the frequency of light can be imaged. In FIG. 10, the upper section illustrates transmission light, while the lower section illustrates the scene of variations in the intensity of the transmission light. As illustrated, transmission light in the phase difference detection method shows the amplitude of an optical carrier wave, varying at a frequency fm.

To realize heterodyne reception in the reception unit 2080, the quadrature modulation unit 2040 not only modulates the intensity of the optical carrier wave but also shifts the frequency of the optical carrier wave by a predetermined amount. In the example of FIG. 10, transmission light is generated by shifting the frequency of the optical carrier wave from fc to fs=fc+Δfs by Δfs and by amplitude-modulating the amplitude of the optical carrier wave at a frequency fm. Note that in quadrature modulation, the intensity modulation and frequency shift of an optical carrier wave can be simultaneously realized by, for example, allowing the distance measurement signals of an in-phase component and a quadrature component that drive the quadrature modulation unit 2040 to be distance measurement signals represented by the following mathematical equation (3), respectively:

[Math 3]

$$I(t)=\{1+A\sin(2\pi f_m t)\}\cos(2\pi\Delta f_s t)$$

$$Q(t)=\{1+A\sin(2\pi f_m t)\}\sin(2\pi\Delta f_s t) \quad (3)$$

Herein A represents the magnitude of amplitude modulation. For example, assuming that the intensity of an optical carrier wave prior to amplitude modulation is 1, an amplitude modulated signal in which light intensity varies according to a sine wave $A\sin(2\pi fmt)$ as illustrated in FIG. 10 is obtained in the case of A<1.

The reception unit 2080 receives reflected light to output a digital beat signal. In this method, reflected light and an optical carrier wave are allowed to interfere with each other to perform heterodyne reception. Therefore, an optical carrier wave or local light corresponding to an optical carrier wave is used as the reference light.

Figure 11:
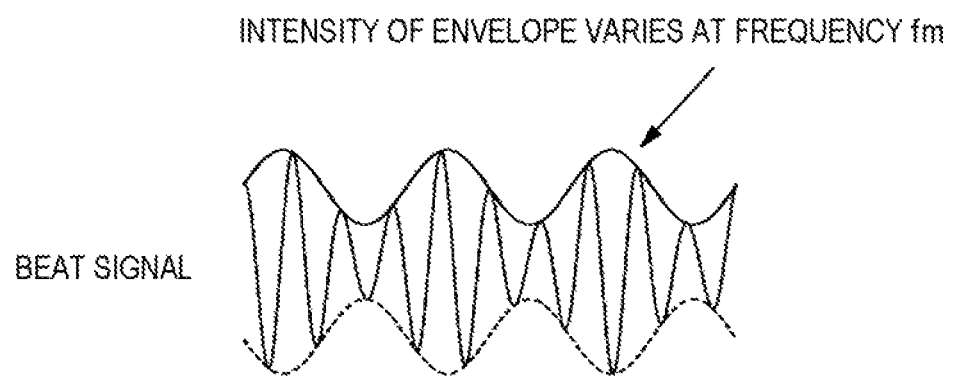
FIG. 11 is a diagram schematically illustrating a digital beat signal in a phase difference detection method.

FIG. 11 is a diagram schematically illustrating a digital beat signal in the phase difference detection method. The digital beat signal includes a frequency component having a frequency fs−(=Δfs) and a frequency component having a frequency fm. The frequency of a signal (hereinafter, envelope signal) represented by the envelope of the digital beat signal becomes fm.

The computation unit 2100 analyzes the digital beat signal to extract the envelope signal. In such a case, a phase difference between the envelope signal and the distance measurement signal represents time for which light travels back and forth between the distance-measuring apparatus 2000 and the object 10 to be measured. Thus, the computation unit 2100 detects the phase difference between the envelope signal and the distance measurement signal to compute time for which light travels back and forth between the distance-measuring apparatus 2000 and the object 10 to be measured, and computes the distance from the distance-measuring apparatus 2000 to the object 10 to be measured on the basis of the time.

ToF Method

In a ToF method, a distance to a target for measurement is computed based on the time-of-flight of reflected light. When the ToF method is used, transmission light is generated by modulating an optical carrier wave so that part of the optical carrier wave is changed on the time axis. The changed elements of the optical carrier wave may be intensity, a frequency, or a phase.

Case in which Intensity is Modulated

Figure 12:
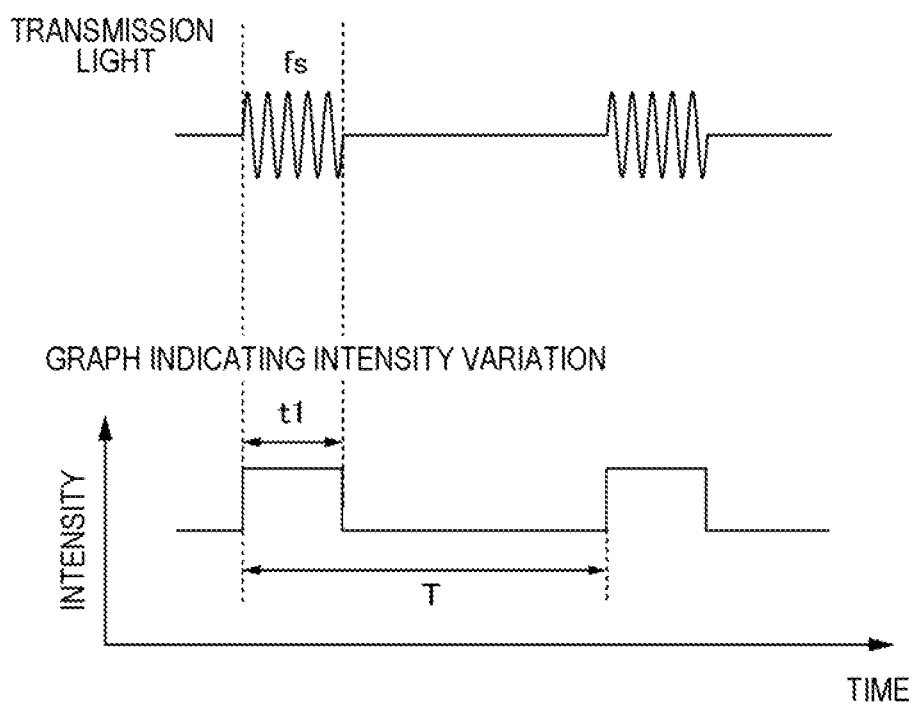
FIG. 12 is a diagram schematically illustrating a case in which the intensity of an optical carrier wave is modulated in a ToF method.

FIG. 12 is a diagram schematically illustrating a case in which the intensity of an optical carrier wave is modulated in the ToF method. The upper section illustrates transmission light, while the lower section illustrates a scene in which intensity variations to which transmission light is subjected. The frequency of the optical carrier wave is set to fc. As illustrated, transmission light in the ToF method using intensity modulation is a pulse signal having a pulse width of t1 and a cycle of T. To carry out heterodyne reception in the reception unit 2080, the quadrature modulation unit 2040 subjects an optical carrier wave to frequency shift as well as intensity modulation. Specifically, the quadrature modulation unit 2040 allows transmission light in a period in which a pulse is turned on to be a light signal having a frequency fs=fc+Δfs to which the frequency of an optical carrier wave is shifted from fc by Δfs, and the intensity of transmission light in a period in which a pulse is turned off to be zero.

More specifically, pulsatile transmission light illustrated in FIG. 12 can be generated by allowing each of the distance measurement signals of the in-phase component and the quadrature component that drive the quadrature modulation unit 2040 to be a signal represented by the following mathematical equation (4):

[Math 4]

$$I(t)=S_{TOF}\cos(2\pi\Delta f_s t)$$

$$Q(t)=S_{TOF}\sin(2\pi\Delta f_s t) \quad (4)$$

Herein S_TOF is a signal indicating 1 when a pulse is turned on and indicating 0 when a pulse is turned off.

The reception unit 2080 allows reflected light to interfere with reference light, performs heterodyne reception, and outputs a digital beat signal. For this reason, the reception unit 2080 uses, as the reference light, an optical carrier wave or local light corresponding to the optical carrier wave.

Figure 13:
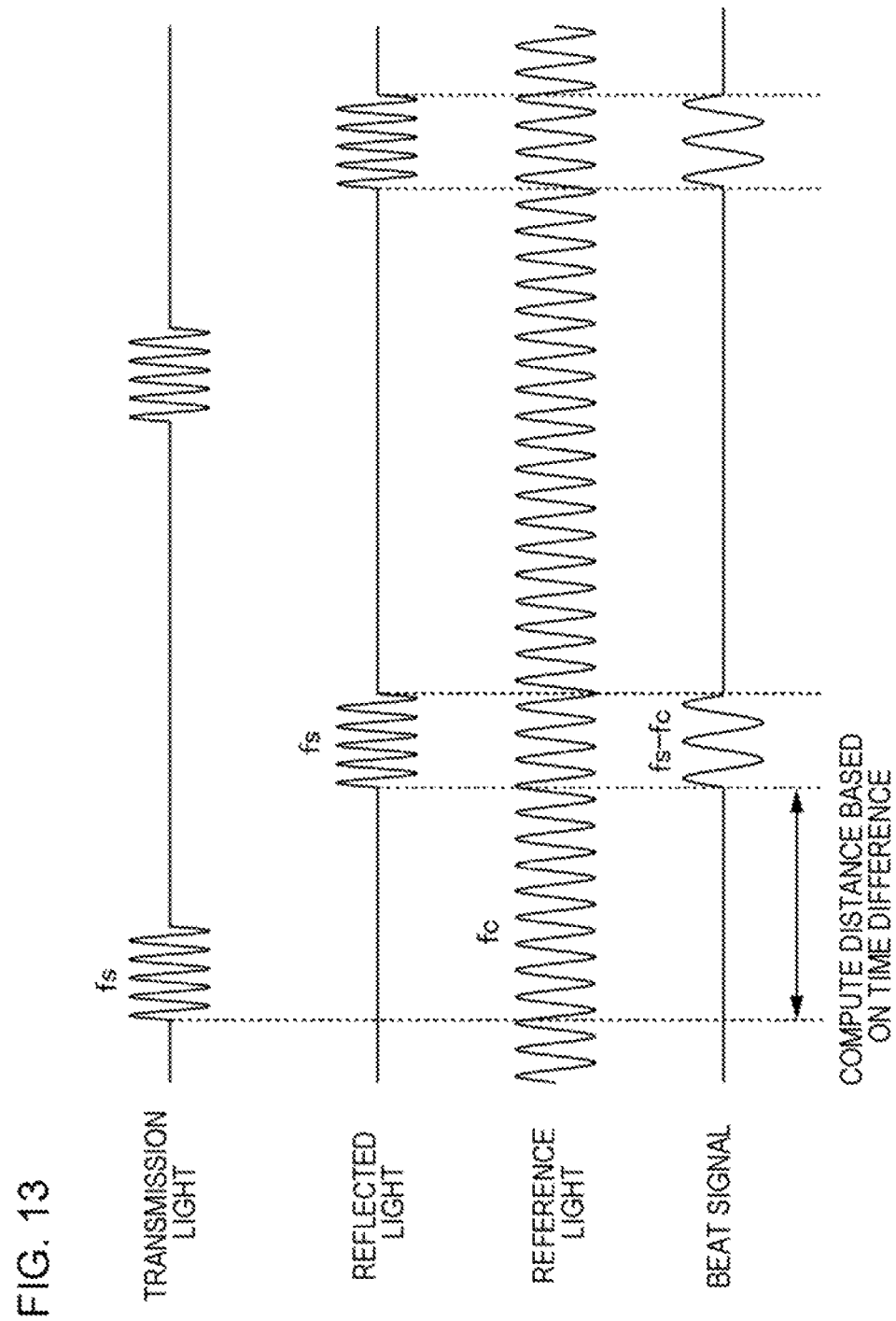
FIG. 13 is a diagram schematically illustrating transmission light, reflected light, reference light, and a digital beat signal in a ToF method in which intensity modulation is carried out.

FIG. 13 is a diagram schematically illustrating transmission light, reflected light, reference light, and a digital beat signal in the ToF method in which intensity modulation is carried out. The digital beat signal is a signal having an intensity of 0 in a period in which the intensity of reflected light is zero and having a frequency fs−fc (=Δfs) in a period in which the intensity of reflected light is not zero. Therefore, the reception unit 2080 can easily determine a period in which the intensity of reflected light is not zero.

The reflected light lags behind transmission light according to a distance from the distance-measuring apparatus 2000 to the object 10 to be measured. Therefore, a time difference between a period in which the intensity of transmission light is not zero and a period in which the intensity of a digital beat signal is not zero becomes equal to time required for travel of light back and forth between the distance-measuring apparatus 2000 and the object 10 to be measured. Thus, the computation unit 2100 computes the time difference, and computes the distance from the distance-measuring apparatus 2000 to the object 10 to be measured on the basis of the computed time difference.

Case in which Frequency is Modulated

Figure 14:
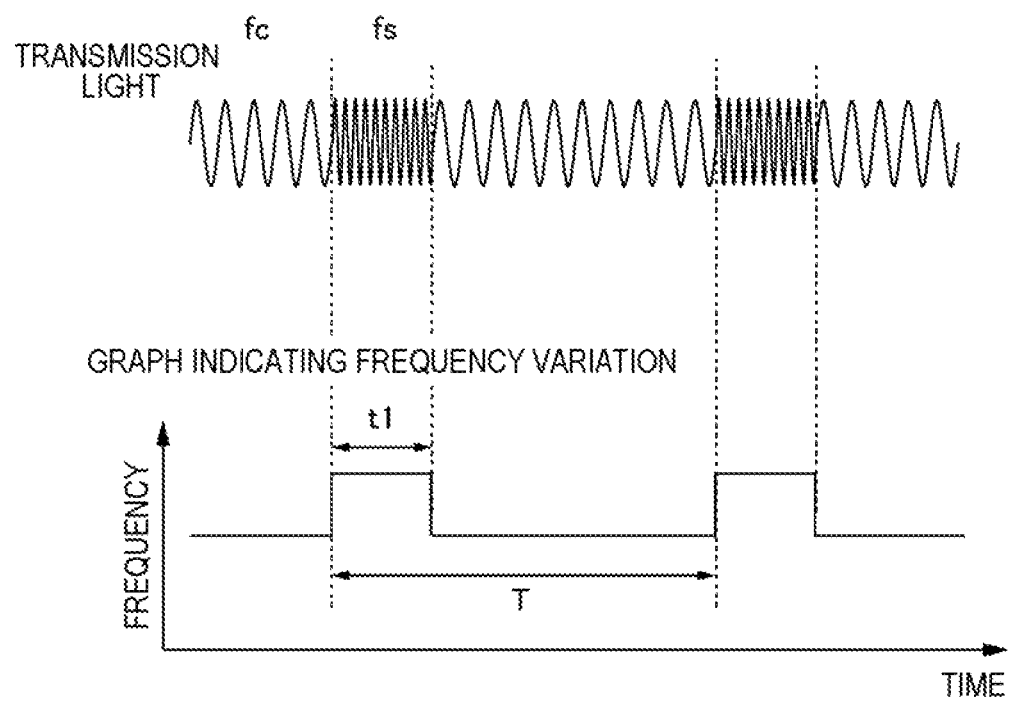
FIG. 14 is a diagram schematically illustrating a case in which the frequency of an optical carrier wave is modulated in a ToF method.

FIG. 14 is a diagram schematically illustrating a case in which the frequency of an optical carrier wave is modulated in the ToF method. The upper section illustrates transmission light, while the lower section illustrates a scene in which the frequency of transmission light varies. The optical carrier wave is a sine wave having a frequency fc. As illustrated, transmission light in the ToF method in which frequency modulation is used is a pulse signal having a pulse width of t1 and a cycle of T; however, unlike FIG. 12, the transmission light is a signal of which the light frequency varies in pulse form. In such a case, the quadrature modulation unit 2040 also similarly subjects an optical carrier wave to frequency modulation to perform heterodyne reception in the reception unit 2080. Specifically, the quadrature modulation unit 2040 uses, as transmission light, a light signal having a frequency fs=fc+Δfs, obtained by shifting the frequency of an optical carrier wave from fc by Δfs, only in a period in which a pulse is turned on.

More specifically, in a period in which a pulse is turned on, transmission light in which the frequency illustrated in FIG. 14 varies in pulse form can be generated (without modulation in a period in which a pulse is turned off) by allowing each of the distance measurement signals of an in-phase component and a quadrature component that drive the quadrature modulation unit 2040 to be a signal represented by the following mathematical equation (5).

[Math 5]

$$I(t)=\cos(2\pi\Delta f_s t)$$

$$Q(t)=\sin(2\pi\Delta f_s t) \quad (5)$$

The reception unit 2080 allows reflected light to interfere with reference light, performs heterodyne reception, and outputs a digital beat signal. For this reason, the reception unit 2080 uses, as the reference light, an optical carrier wave, transmission light, or local light corresponding to the optical carrier wave.

Figure 15:
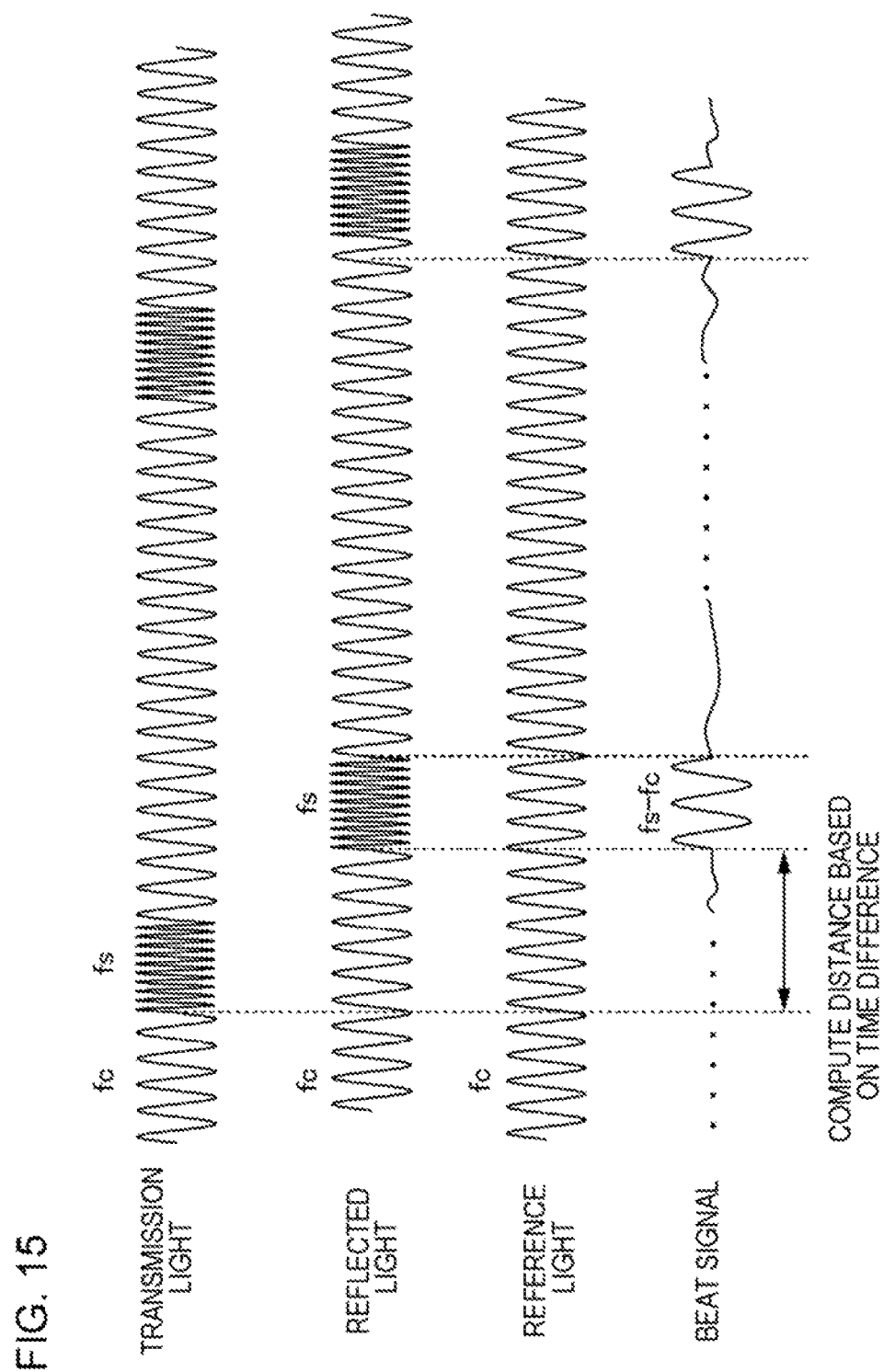
FIG. 15 is a diagram schematically illustrating transmission light, reflected light, reference light, and a digital beat signal in a ToF method in which frequency modulation is carried out.

FIG. 15 is a diagram schematically illustrating transmission light, reflected light, reference light, and a digital beat signal in the ToF method in which frequency modulation is carried out. A digital beat signal in a period in which the frequency of reflected light is fs becomes a signal having a frequency fs−fc (=Δfs). On the other hand, a digital beat signal in a period in which the frequency of reflected light is fc includes beat components having the same frequency, and is therefore converted into a direct-current component; however, actually, the digital beat signal is gently changed due to the initial phases and phase fluctuations of reference light and reflected light. Since there is a difference between a digital beat signal in a period in which the frequency of reflected light is fs and a digital beat signal in a period in which the frequency of reflected light is fc as described above, the boundary therebetween can be detected. Specifically, the boundary between a digital beat signal in a period in which the frequency of reflected light is fs and a digital beat signal in a period in which the frequency of reflected light is fc becomes a discontinuous point, and therefore, the boundary between the periods can be detected by detecting the discontinuous point. The discontinuous point can be detected by analyzing the time variations of the values of the digital beat signals using, for example, a differentiation circuit or the like.

An increase in frequency fs results in an increased difference between a digital beat signal in a period in which the frequency of reflected light is fc and a beat signal in a period in which the frequency of reflected light is fs, thereby facilitating detection of the boundary between the periods. The preferred value of the frequency fs can be found by, for example, operation testing of the distance-measuring apparatus 2000 in advance.

When a frequency is modulated by Δfs0, different from Δfs, without non-modulation in a period in which the frequency of the transmission light is fc, or when local light having a frequency slightly different from the optical frequency fc of a transmission light source is used as reference light used for reception, a beat signal having a predetermined frequency is also generated on the receiving end in a period in which a pulse is turned off. Thus, the boundary between frequencies varying in pulse form in reflected light can be more easily detected.

The reflected light lags behind transmission light according to a distance from the distance-measuring apparatus 2000 to the object 10 to be measured. Therefore, a difference between a period in which the frequency of transmission light is fs and a period in which the frequency of a digital beat signal is fs−fc (=Δfs) becomes equal to time required for travel of light back and forth between the distance-measuring apparatus 2000 and the object 10 to be measured. Thus, the computation unit 2100 computes the time difference, and computes the distance from the distance-measuring apparatus 2000 to the object 10 to be measured on the basis of the computed time difference.

Case in which Phase is Modulated

Figure 16:
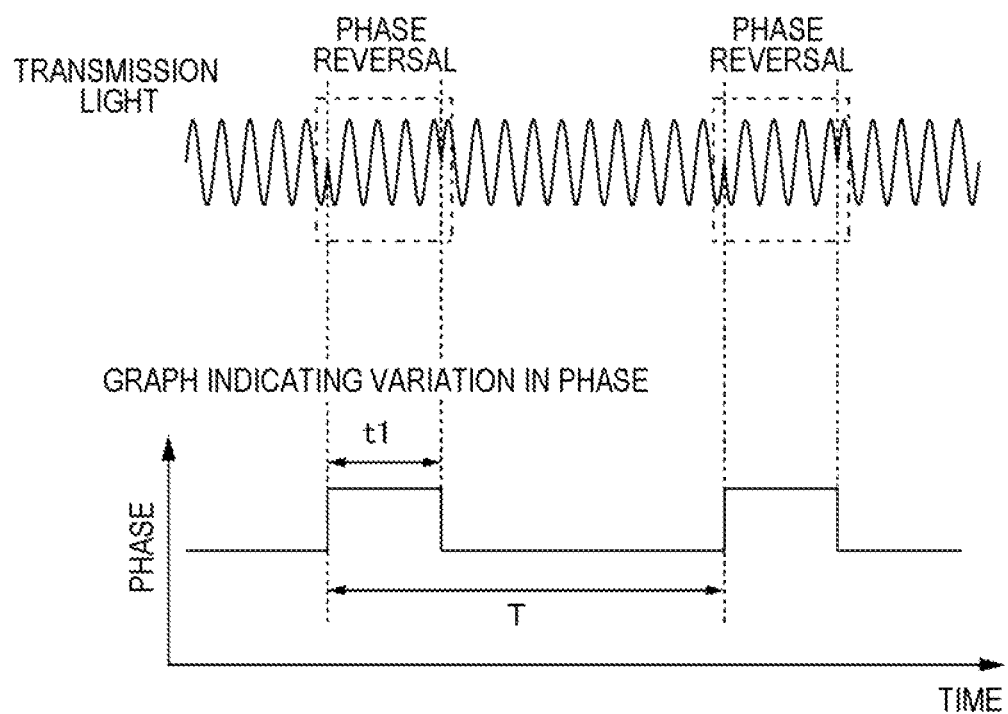
FIG. 16 is a diagram schematically illustrating a case in which the phase of an optical carrier wave is modulated in a ToF method.

FIG. 16 is a diagram schematically illustrating a case in which the phase of an optical carrier wave is modulated in the ToF method. The upper section illustrates transmission light, while the lower section illustrates a scene in which the phase of transmission varies. The optical carrier wave is a sine wave having a frequency fc. As illustrated, transmission light in the ToF method in which phase modulation is used is a pulse signal having a pulse width of t1 and a cycle of T; however, unlike FIGS. 12 and 14, the transmission light is a signal in which the phase of light varies in pulse form. The quadrature modulation unit 2040 subjects an optical carrier wave to phase modulation. Specifically, the quadrature modulation unit 2040 generates, as transmission light, a light signal in which the phase of an optical carrier wave is 180-degree reversed in a period in which a pulse is turned on in a distance measurement signal.

The reception unit 2080 allows reflected light to interfere with reference light, performs heterodyne reception, and outputs a digital beat signal. For this reason, the reception unit 2080 uses, as the reference light, an optical carrier wave, transmission light, or local light corresponding to the optical carrier wave.

Figure 17:
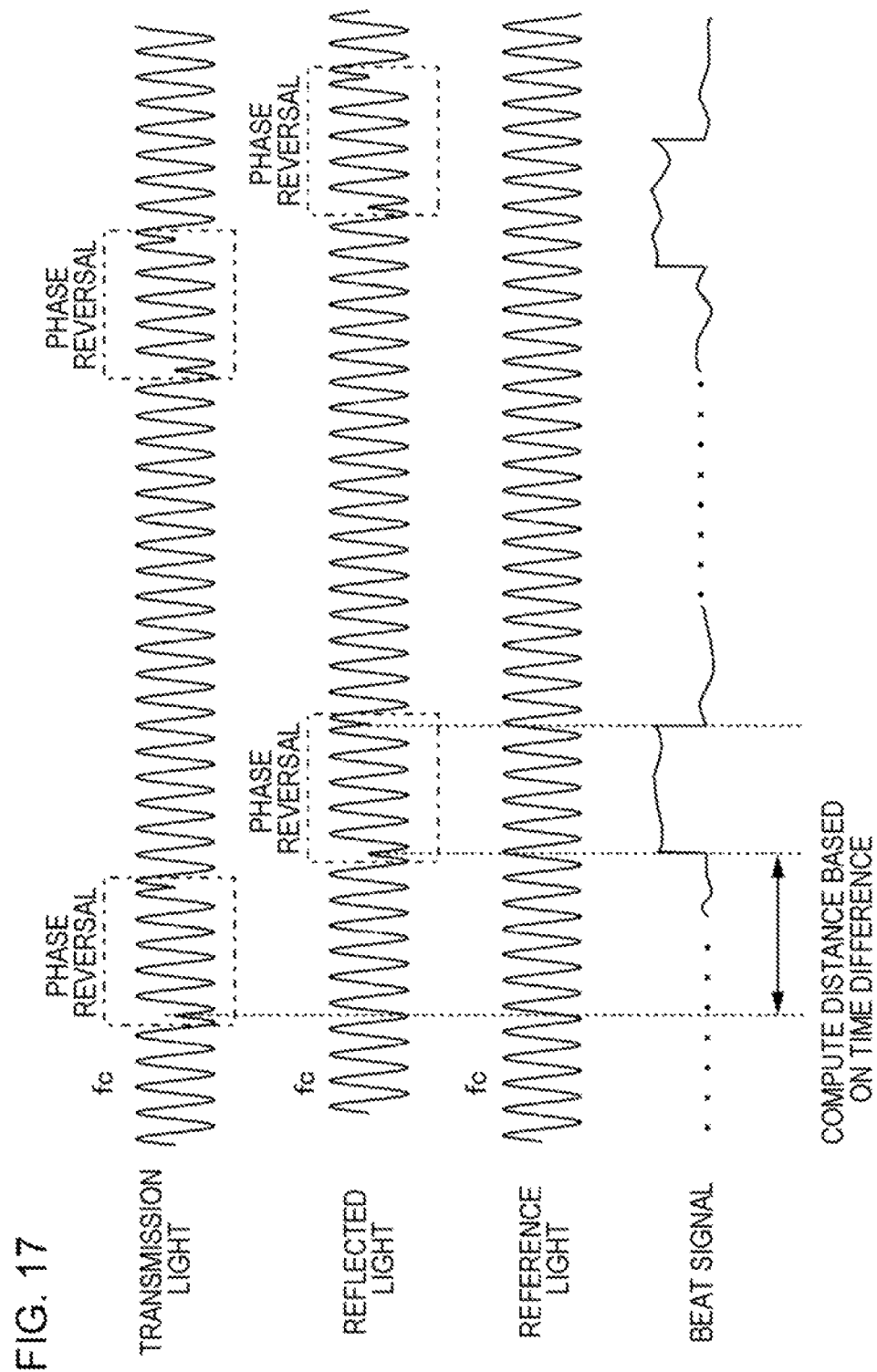
FIG. 17 is a diagram schematically illustrating transmission light, reflected light, reference light, and a digital beat signal in a ToF method in which phase modulation is carried out.

FIG. 17 is a diagram schematically illustrating transmission light, reflected light, reference light, and a digital beat signal in the ToF method in which phase modulation is carried out. The digital beat signal is a signal changed due to the initial phases and phase fluctuations of reference light and reflected light. However, a boundary between a digital beat signal in a period in which the phase of reflected light is modulated and a digital beat signal in a period in which the phase of reflected light is not modulated becomes a discontinuous point at which the signals are greatly changed. Therefore, the boundary between the periods can be detected by detecting the discontinuous point. A method of detecting the discontinuous point is described above.

As described above, it is also acceptable to positively apply a frequency shift to transmission light or to receive local light of which the frequency is shifted in reception so that a beat having a predetermined frequency appears on a digital beat signal in reception. In this case, a boundary at which a variation in the phase of the obtained digital beat signal is clearly changed may also be detected.

As described above, the reflected light lags behind transmission light according to a distance from the distance-measuring apparatus 2000 to the object 10 to be measured. Therefore, a difference between a period in which the phase of the transmission light is modulated and a period in which the phase of the reflected light is modulated becomes equal to time required for travel of light back and forth between the distance-measuring apparatus 2000 and the object 10 to be measured. Thus, the computation unit 2100 computes the time difference, and computes the distance from the distance-measuring apparatus 2000 to the object to be measured on the basis of the computed time difference.

Output of Result

The measurement distance computed by the computation unit 2100 is output to various destinations. For example, the computation unit 2100 allows the computed measurement distance to be stored in a predetermined storage device. In addition, for example, the computation unit 2100 displays the computed measurement distance on a display apparatus connected to the distance-measuring apparatus 2000. In addition, for example, the computation unit 2100 may also output the computed measurement distance to another computer (such as a PC, a server apparatus, or a portable terminal).

Note that an identical pattern is repeated in various types of previously illustrated transmission light, and the computation unit 2100 can compute one measurement distance according to each pattern. Thus, the computation unit 2100 may be configured so that the statistic of measurement distances computed in a plurality of patterns in a predetermined period (for example, 1 second) is computed, and the statistic is output as computation results. For example, the statistic is an average value or the like.

Example Embodiment 2

Figure 18:
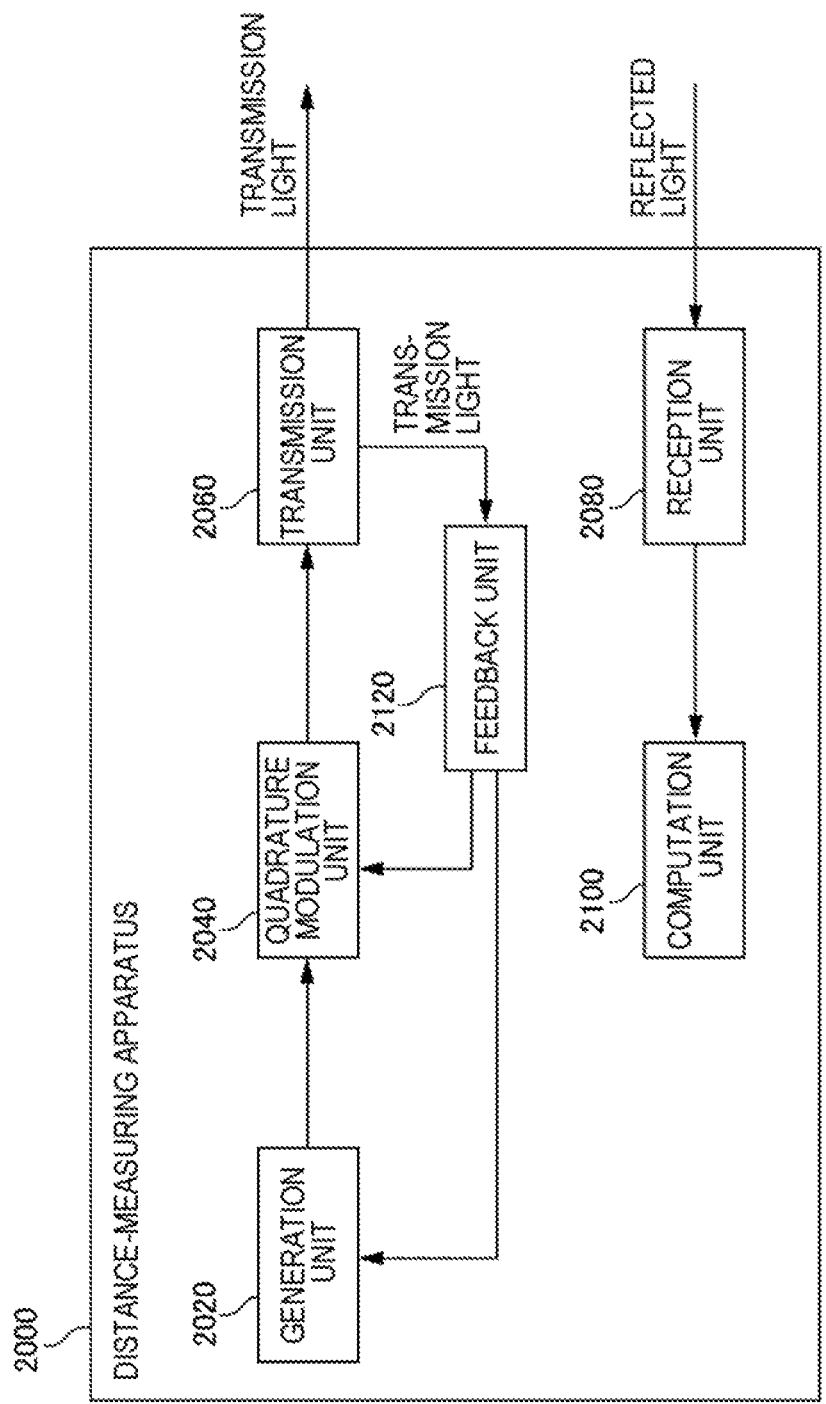
FIG. 18 is a block diagram illustrating a distance-measuring apparatus 2000 of an example embodiment 2.

FIG. 18 is a block diagram illustrating a distance-measuring apparatus 2000 of an example embodiment 2. The distance-measuring apparatus 2000 of the example embodiment 2 has functions similar to those of the distance-measuring apparatus 2000 of the example embodiment 1 except items described below.

When a quadrature modulator modulates an optical carrier wave on the basis of a distance measurement signal, transmission light which is not ideal may be output due to various problems (IQ imbalance, IQ skew, MZ null point movement, and the like) resulting from the characteristics of the quadrature modulator. Thus, the distance-measuring apparatus 2000 of the example embodiment 2 has the function of performing feedback control based on a difference between transmission light output from a quadrature modulation unit 2040 and ideal transmission light to allow the transmission light to be closer to ideal form. A functional configuration unit realizing the function is referred to as a feedback unit 2120.

When actual transmission light differs from ideal transmission light, a problem may occur in receiving reflected light. For example, when actual transmission light includes fluctuations having intensity which is not intended, a frequency component other than a beat frequency is generated, thereby precluding detection of a beat signal, when reflected light is heterodyne-received. As a result, the precision of distance measurement may be deteriorated.

In accordance with the distance-measuring apparatus 2000 of the present example embodiment, feedback control based on actual transmission light is performed to allow the transmission light to be closer to ideal form, and therefore, measurement precision can be enhanced.

The distance-measuring apparatus 2000 of the present example embodiment also has an advantage in that feedback control can be realized without superimposing a special control signal such as a dither signal on transmission light, and therefore, it is possible to avoid the deterioration of reception characteristics caused by the feedback control. In this regard, in an optical communication system, it is common to superimpose a dither signal or the like for control on an actual transmission signal and monitor variations thereof to perform feedback control. However, such a dither signal may deteriorate reception characteristics in a reception apparatus. The distance-measuring apparatus 2000 performs feedback control without causing the deterioration of such reception characteristics.

Hereinafter, the details of control performed by the feedback unit 2120 will be described according to each distance measurement method used by the distance-measuring apparatus 2000.

Case of Frequency Difference Detection Method

Figure 19:
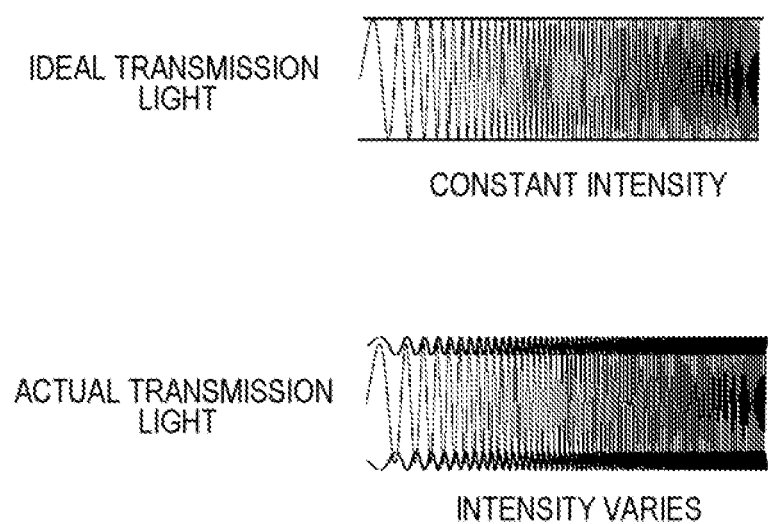
FIG. 19 is a diagram of a comparison between actual transmission light and ideal transmission light in a frequency difference detection method.

FIG. 19 is a diagram of a comparison between actual transmission light and ideal transmission light in the frequency difference detection method. As described above, in the frequency difference detection method, it is only necessary to modulate the frequency of an optical carrier wave, and it is not necessary to modulate intensity. However, the intensity of actual transmission light can vary due to an influence such as IQ imbalance or bias deviation.

Thus, the feedback unit 2120 performs the bias control of the quadrature modulation unit 2040 or the control of the timing of outputting a distance measurement signal from a generation unit 2020 in such a way as to decrease a variation in the intensity of transmission light output from the quadrature modulation unit 2040.

In such a case, a difference between maximum and minimum values, i.e., a variation in light intensity usually should become zero if ideal quadrature modulation is performed. However, when a nonideal condition such as the IQ imbalance of a quadrature modulator, the skew of an IQ modulating signal, or the bias deviation of a Mach-Zehnder type modulator is applied to quadrature modulation, light intensity does not become constant but varies. Therefore, the state of the quadrature modulation can be monitored by monitoring a difference between the maximum and minimum values of transmission light.

Thus, for example, the feedback unit 2120 can be configured as described below. The feedback unit 2120 monitors the light intensity of transmission light using a photodetector. The feedback unit 2120 detects the maximum and minimum values of the light intensity on the basis of the monitoring results. The feedback unit 2120 obtains the variation amount of light intensity by obtaining a difference between the maximum and minimum values described above. The feedback unit 2120 adjusts IQ imbalance, IQ skew, or bias deviation which may cause a variation in light intensity on the basis of the variation amount of light intensity.

In such a case, all of the IQ imbalance, the IQ skew, and the bias deviation are independent events. Therefore, any one or more of IQ imbalance, IQ skew, and bias may be adjusted in turn in such a way as to, for example, achieve the lowest magnitude of a variation in light intensity obtained by monitoring the light intensity in a feedback control method. However, the order of the adjustment thereof is optional. In such a case, as a method of adjustment to the extreme value (minimum value), a common technique such as a hill-climbing method can be used, or any algorithm can be used.

Note that as specific means of adjusting IQ imbalance, IQ skew, or bias deviation, it is acceptable to directly give feedback to the bias adjustment terminal of the quadrature modulator causing the IQ imbalance, the IQ skew, or the bias deviation, or to apply inverse characteristics to a digital domain for making correction in advance in a digital processor generating a distance measurement signal.

Case of Phase Difference Detection Method

Figure 20:
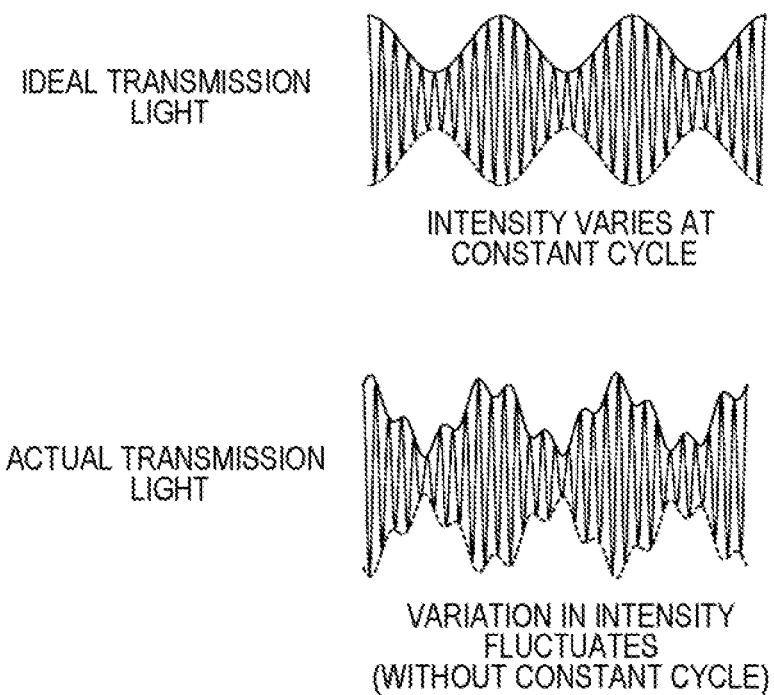
FIG. 20 is a diagram of a comparison between actual transmission light and ideal transmission light in a phase difference detection method.

FIG. 20 is a diagram of a comparison between actual transmission light and ideal transmission light in a phase difference detection method. The intensity of the ideal transmission light varies in a constant cycle. In other words, the intensity varies in an ideal single sine wave. In contrast, when there is an influence such as IQ imbalance, the intensity of actual transmission light varies little by little in a cycle of Δfs in addition to a desired variation in a single sine wave. This intensity variation component is an unnecessary component, which adversely affects reception characteristics and distance measurement precision.

Thus, the feedback unit 2120 performs the bias control of the quadrature modulation unit 2040 or the control of the timing of outputting a distance measurement signal from the generation unit 2020 in such a way as to reduce the fluctuation of a variation in the intensity of transmission light output from the quadrature modulation unit 2040. For example, like the frequency difference detection method described above, transmission light output from the quadrature modulation unit 2040 is branched, and a difference between the maximum and minimum values of the light intensity thereof is computed. As described above, a variation in the intensity of actual transmission light fluctuates, and therefore, the computed difference becomes greater than a difference between the maximum and minimum values of the light intensity of ideal transmission light. Thus, the quadrature modulation unit 2040 performs feedback control in such a way as to allow the computed difference to be closer to the amplitude of a distance measurement signal. For example, the quadrature modulation unit 2040 computes a difference between a difference between the maximum and minimum values of the light intensity of actual transmission light and the amplitude of a distance measurement signal, and performs feedback control so that the difference becomes small. Note that a technique similar to the frequency difference detection method described above can be used for the specific algorithm of the feedback control, a method of adjusting IQ imbalance, IQ skew, and the bias of the quadrature modulator, and the like.

Case of ToF Method

As described above, one form in the case of using a ToF method is a form in which the frequency of an optical carrier wave is modulated based on a distance measurement signal. The intensity of transmission light in this case ideally becomes constant. However, like transmission light in the frequency difference detection method, the intensity may fluctuate due to IQ imbalance and the like.

Thus, the feedback unit 2120 performs feedback control in such a way as to reduce a variation in the intensity of actual transmission light. A specific method thereof is similar to the feedback control in the frequency difference detection method.

The example embodiments of the present invention have been described with reference to the drawings. However, these are illustrations of the present invention, and various configurations other than the above can also be adopted.

The invention claimed is:

1. A distance-measuring apparatus comprising:
   a generation unit that generates a distance measurement signal;
   a quadrature modulation unit that subjects an optical carrier wave to quadrature modulation, based on the distance measurement signal, to generate transmission light;
   a transmission unit that transmits the generated transmission light;
   a reception unit that receives reflected light which is light generated by reflecting the transmission light on an object to be measured; and
   a computation unit that compares the reflected light with reference light to compute a distance to the object to be measured,
   wherein the generation unit includes a digital signal processor,
   wherein the quadrature modulation unit includes a Mach-Zehnder type optical modulator,
   wherein the transmission unit includes an optical system,
   wherein the reception unit includes an optical system,
   wherein the computation unit includes a digital signal processor,
   wherein the computation unit allows the reflected light and the reference light to interfere with each other to generate a beat signal, and computes the distance to the object to be measured, based on the beat signal,
   wherein the quadrature modulation unit modulates the optical carrier wave in a partial period in a predetermined period, and
   wherein the computation unit detects, by using the beat signal, a boundary time point which is a boundary between the partial period and another period in the reflected light, and compares the boundary time point and a time point corresponding to the boundary time point in the transmission light to compute the distance to the object to be measured.

2. The distance-measuring apparatus according to claim 1, wherein the quadrature modulation unit modulates a frequency of the optical carrier wave, and
   wherein the computation unit computes a frequency difference between the reference light and the reflected light, based on the beat signal, and computes the distance to the object to be measured, based on the computed frequency difference.

3. The distance-measuring apparatus according to claim 1, wherein the quadrature modulation unit performs intensity modulation of the optical carrier wave and frequency shift of the optical carrier wave, based on the distance measurement signal, and
   wherein the computation unit computes the distance to the object to be measured, based on a phase difference between a signal represented by an envelope of the beat signal and the reference light.

4. The distance-measuring apparatus according to claim 1, wherein the computation unit computes the distance to the object to be measured using a frequency difference detection method or a time-of-flight method.

5. A distance-measuring apparatus comprising:
a generation unit that generates a distance measurement signal;
a quadrature modulation unit that subjects an optical carrier wave to quadrature modulation, based on the distance measurement signal, to generate transmission light
a transmission unit that transmits the generated transmission light
a reception unit that receives reflected light which is light generated by reflecting the transmission light on an object to be measured; and
a computation unit that compares the reflected light with reference light to compute a distance to the object to be measured,
wherein the generation unit includes a digital signal processor,
wherein the quadrature modulation unit includes a Mach-Zehnder type optical modulator,
wherein the transmission unit includes an optical system,
wherein the reception unit includes an optical system,
wherein the computation unit includes a digital signal processor,
wherein the apparatus further comprises at least one processor configured to implement a feedback unit that acquires the transmission light generated by the quadrature modulation unit, and performs, based on a variation in intensity of the transmission light, feedback control that reduces a deviation between the acquired transmission light and transmission light in ideal form,
wherein the quadrature modulation unit modulates a frequency of the optical carrier wave, and
wherein the feedback unit performs the feedback control in such a way as to reduce the variation in intensity of the transmission light.

6. The distance-measuring apparatus according to claim 5, wherein the feedback unit performs the feedback control in such a way as to reduce in-phase quadrature-phase (IQ) imbalance, IQ skew, or a bias deviation in the quadrature modulation unit.

7. A distance-measuring apparatus comprising:
a generation unit that generates a distance measurement signal;
a quadrature modulation unit that subjects an optical carrier wave to quadrature modulation, based on the distance measurement signal, to generate transmission light
a transmission unit that transmits the generated transmission light
a reception unit that receives reflected light which is light generated by reflecting the transmission light on an object to be measured; and
a computation unit that compares the reflected light with reference light to compute a distance to the object to be measured,
wherein the generation unit includes a digital signal processor,
wherein the quadrature modulation unit includes a Mach-Zehnder type optical modulator,
wherein the transmission unit includes an optical system,
wherein the reception unit includes an optical system,
wherein the computation unit includes a digital signal processor,
wherein the apparatus further comprises at least one processor configured to implement a feedback unit that acquires the transmission light generated by the quadrature modulation unit, and performs, based on a variation in intensity of the transmission light, feedback control that reduces a deviation between the acquired transmission light and transmission light in ideal form,
wherein the quadrature modulation unit modulates intensity of the optical carrier wave, and
wherein the feedback unit performs the feedback control in such a way as to reduce a difference between a range of the variation in intensity of the acquired transmission light and a range of a variation in intensity of the transmission light in ideal form.

8. A control method executed by a computer, the method comprising:
generating a distance measurement signal;
orthogonally modulating an optical carrier wave based on the distance measurement signal to generate transmission light;
transmitting the generated transmission light;
receiving reflected light which is light generated by reflecting the transmission light on an object to be measured; and
comparing the reflected light with reference light to compute a distance to the object to be measured,
wherein, in the orthogonally modulating, a Mach-Zehnder type optical modulator is used for generating the transmission light,
wherein in the comparing, the reflected light and the reference light are allowed to interfere with each other to generate a beat signal, and the distance to the object to be measured is computed based on the beat signal,
wherein in the orthogonally modulating, the optical carrier wave is modulated in a partial period in a predetermined period, and
wherein, in the comparing, a boundary time point which is a boundary between the partial period and another period in the reflected light is detected by using the beat signal, and the boundary time point and a time point corresponding to the boundary time point in the transmission light are compared to compute the distance to the object to be measured.

9. The control method according to claim 8, wherein in the orthogonally modulating, a frequency of the optical carrier wave is modulated, and
wherein, in the comparing, a frequency difference between the reference light and the reflected light is computed, based on the beat signal, and the distance to the object to be measured is computed, based on the computed frequency difference.

10. The control method according to claim 8, wherein in the orthogonally modulating, intensity modulation of the optical carrier wave and frequency shift of the optical carrier wave, based on the distance measurement signal, are performed, and
wherein, in the comparing, the distance to the object to be measured is computed, based on a phase difference between a signal represented by an envelope of the beat signal and the reference light.

11. The control method according to claim 8, wherein, in the comparing the reflected light, a frequency difference detection method or a time-of-flight method is used for computing the distance to the object to be measured.

12. A control method executed by a computer, the method comprising:
- generating a distance measurement signal;
- orthogonally modulating an optical carrier wave based on the distance measurement signal to generate transmission light
- transmitting the generated transmission light
- receiving reflected light which is light generated by reflecting the transmission light on an object to be measured; and
- comparing the reflected light with reference light to compute a distance to the object to be measured,
- wherein, in the orthogonally modulating, a Mach-Zehnder type optical modulator is used for generating the transmission light,
- wherein the method further comprises:
  - acquiring the transmission light generated in the orthogonally modulating; and
  - performing, based on a variation in intensity of the transmission light, feedback control that reduces a deviation between the acquired transmission light and transmission light in ideal form,
- wherein in the orthogonally modulating, a frequency of the optical carrier wave is modulated, and
- wherein, the performing the feedback control is performed in such a way as to reduce the variation in intensity of the transmission light.

13. The control method according to claim 12, wherein the performing the feedback control in such a way as to reduce in-phase quadrature-phase (IQ) imbalance, IQ skew, or a bias deviation in the orthogonally modulating.

14. A control method executed by a computer, the method comprising:
- generating a distance measurement signal;
- orthogonally modulating an optical carrier wave based on the distance measurement signal to generate transmission light
- transmitting the generated transmission light
- receiving reflected light which is light generated by reflecting the transmission light on an object to be measured; and
- comparing the reflected light with reference light to compute a distance to the object to be measured,
- wherein, in the orthogonally modulating, a Mach-Zehnder type optical modulator is used for generating the transmission light,
- wherein the method further comprises:
  - acquiring the transmission light generated in the orthogonally modulating; and
  - performing, based on a variation in intensity of the transmission light, feedback control that reduces a deviation between the acquired transmission light and transmission light in ideal form,
- wherein in the orthogonally modulating, intensity of the optical carrier wave is modulated, and
- wherein, the performing the feedback control is performed in such a way as to reduce a difference between a range of the variation in intensity of the acquired transmission light and a range of a variation in intensity of the transmission light in ideal form.

* * * * *